United States Patent
Whitney et al.

(10) Patent No.: US 12,188,536 B2
(45) Date of Patent: Jan. 7, 2025

(54) BORON NITRIDE NANOTUBE VIBRATION DAMPING OPTIMIZATION

(71) Applicant: BNNT, LLC, Newport News, VA (US)

(72) Inventors: R. Roy Whitney, Newport News, VA (US); Thomas G. Dushatinski, Chesapeake, VA (US); Thomas W. Henneberg, Newport News, VA (US); Kevin C. Jordan, Newport News, VA (US); Jonathan C. Stevens, Williamsburg, VA (US); Michael W. Smith, Newport News, VA (US); Clay F. Huff, Newport News, VA (US); Lyndsey R. Scammell, Newport News, VA (US); Alex I Wixtrom, Newport News, VA (US)

(73) Assignee: BNNT, LLC, Newport News, VA (US)

(*) Notice: Subject to any disclaimer, the term of this patent is extended or adjusted under 35 U.S.C. 154(b) by 698 days.

(21) Appl. No.: 17/420,966

(22) PCT Filed: Jan. 7, 2020

(86) PCT No.: PCT/US2020/012453
§ 371 (c)(1),
(2) Date: Jul. 6, 2021

(87) PCT Pub. No.: WO2020/146298
PCT Pub. Date: Jul. 16, 2020

(65) Prior Publication Data
US 2022/0099151 A1 Mar. 31, 2022

Related U.S. Application Data

(60) Provisional application No. 62/789,257, filed on Jan. 7, 2019.

(51) Int. Cl.
*F16F 7/00* (2006.01)
*C01B 21/064* (2006.01)
*F16F 1/36* (2006.01)

(52) U.S. Cl.
CPC ........ *F16F 1/3605* (2013.01); *C01B 21/0648* (2013.01); *C01P 2004/03* (2013.01);
(Continued)

(58) Field of Classification Search
CPC ................ F16F 1/3605; F16F 2226/04; F16F 2228/007; C01B 21/0648; C01P 2004/03; C01P 2004/04
See application file for complete search history.

(56) References Cited

U.S. PATENT DOCUMENTS

| 3,673,118 A | 6/1972 | Mandorf, Jr. et al. |
| 2010/0200208 A1* | 8/2010 | Cola ............... B82Y 40/00 165/185 |

(Continued)

FOREIGN PATENT DOCUMENTS

| JP | 2007-290908 | 11/2007 |
| JP | 2010-230156 | 10/2010 |

(Continued)

OTHER PUBLICATIONS

International Search Report for PCT/US2020/012453 mailed Mar. 20, 2020, 2 pages.
Written Opinion of the ISA for PCT/US2020/012453 mailed Mar. 20, 2020, 6 pages.

*Primary Examiner* — Bradley T King
(74) *Attorney, Agent, or Firm* — Joshua B. Brady; Nixon & Vanderhye, P.C.

(57) ABSTRACT

The structural integrity and viscoelastic performance of boron nitride nanotube (BNNT) materials may be improved through forming a compressed BNNT buckyweave. The BNNT buckyweave may be formed from a BNNT buckypa-
(Continued)

per having a bulk nanotube alignment (partial alignment) that may be maintained when forming the BNNT buckyweave, and compression may be parallel to and/or perpendicular to the partial alignment. The BNNT material may be viscoelastically-enhanced through, e.g., selection of synthesized BNNT material, impurity removal/reduction, BNNT alignment, isotopically enhancement, and compression relative to alignment. BNNT buckyweave s are introduced. The present approach provides viscoelastic behavior over temperatures from near absolute zero to near 1900 K. The transport of phonons along the BNNT molecules may be enhanced by utilizing isotopically enhanced BNNTs.

30 Claims, 17 Drawing Sheets

(52) U.S. Cl.
CPC ....... *C01P 2004/04* (2013.01); *F16F 2226/04* (2013.01); *F16F 2228/007* (2013.01)

(56) References Cited

U.S. PATENT DOCUMENTS

| 2014/0154941 | A1* | 6/2014 | Zhamu | H01B 1/04 977/734 |
| 2014/0287641 | A1* | 9/2014 | Steiner, III | F41H 5/0471 428/317.1 |
| 2016/0010780 | A1* | 1/2016 | Withers | F16L 55/1656 156/60 |
| 2017/0044016 | A1* | 2/2017 | Smith | B82Y 30/00 |
| 2018/0134418 | A1* | 5/2018 | Hocker | B64G 1/62 |
| 2018/0257196 | A1* | 9/2018 | Simpson | B24C 1/04 |
| 2019/0092643 | A1* | 3/2019 | Whitney | F16F 1/3605 |
| 2023/0286801 | A1* | 9/2023 | Dushatinski | C01B 21/0648 |

FOREIGN PATENT DOCUMENTS

| WO | 2006/102579 | 9/2006 |
| WO | WO 2015/164777 | 10/2015 |
| WO | 2018/102437 | 6/2018 |
| WO | 2018/148286 | 8/2018 |

\* cited by examiner

41

42

BORON NITRIDE NANOTUBE VIBRATION DAMPING OPTIMIZATION

CROSS REFERENCE TO RELATED APPLICATIONS

This application is related to International Application No. PCT/US2018/017231, filed Feb. 7, 2018, the contents of which are incorporated herein by reference.

This application is the U.S. national phase of International Application No. PCT/US2020/012453 filed Jan. 7, 2020 which designated the U.S. and claims priority to U.S. Patent Application No. 62/789,257 filed Jan. 7, 2019, the entire contents of each of which are hereby incorporated by reference.

FIELD OF THE INVENTION

The present disclosure relates to vibration dampers comprised of boron nitride nanotubes (BNNTs), including viscoelastically-enhanced BNNTs, and methods of optimizing the viscoelastic properties of BNNTs for vibration damping.

BACKGROUND

Passive vibration damping occurs when vibrational energy is converted into heat in a viscoelastic material, a fluid, or a gas. Common examples of passive vibration damping include rubber washers (viscoelastic material) used in attaching motors to their frames and shock absorbers (fluid) in a vehicle. One disadvantage with most materials used for passive viscoelastic vibration damping is that they only perform well in a narrow range of temperatures. For example, rubber washers typically become rigid at temperatures below zero degrees centigrade and will degrade and/or burn at temperatures at/above several hundred degrees centigrade. Nevertheless, viscoelastic materials when available are usually preferred for vibration damping because they: 1) have only the motions associated with the vibrations; 2) have no moving fluids or gases; and 3) require no electrical controls and power associated with active vibration damping. There exists a need for improved viscoelastic materials having applicability in a wide temperature range.

Boron nitride nanotubes (BNNTs) have been shown to have these passive vibration damping characteristics. Prior attempts at utilizing BNNTs as vibration dampers have seen little success, primarily because of the need to maintain structural integrity of the BNNTs in the form factor selected for use as a vibration damper. For example, in a 2016 publication, Hong et al. used commercially available BNNTs to form single-layers compressed mats to test bulk material viscoelasticity, and suggested stacked layers of compressed BNNTs to meet material volume and form factor requirements. Yet in practice, merely stacking layers of compressed BNNTs results in a BNNT mat having little bulk structural integrity, particularly at layer interfaces. These BNNT mats fail to maintain their form factor after minimal use, and are thus unsuitable for vibration damping. Compressing stacked layers of BNNTs also results in insufficient structural integrity for vibration damping, largely due to the same points of failure.

What is needed, then, is a multi-layer BNNT vibration damper having sufficient structural integrity for use as a vibration damper. Further, what is needed are methods to refine synthesized BNNTs for use in vibration damping applications.

SUMMARY

BNNTs have exceptional viscoelastic behavior, and BNNT material may be processed into desired configurations for use as a vibration damping material. Such uses require sufficient structural integrity within the BNNT material, particularly with respect to embodiments having more than one layer of BNNT material. Forming a BNNT buckypaper may, for some synthesized BNNTs, result in sufficient structural integrity, but the relatively thin nature of a BNNT buckypaper is likely inadequate for most form factors, and prevents the benefit of compression to enhance the viscoelasticity of the BNNTs. Stacking multiple BNNT buckypapers may generate sufficient thickness for compression, but the lack of structural integrity between layers may be insufficient for most embodiments. Forming one or more buckyweaves, however, overcomes the structural integrity challenge, and presents an efficient solution for a wide variety of vibration damper applications.

Advantageously, the viscoelastic performance of BNNT material may also be enhanced through, for example, refining (also known as purifying) the synthesized BNNT material, aligning BNNTs in the material, isotopically enhancing the BNNT material, controlling the density of the BNNT material, and combinations thereof. Decreasing the amount of boron particles in a BNNT material increases the amount of available BN surface area to participate in intermolecular interactions thereby improving the nanoscale friction that generates the viscoelastic behavior. Aligning, including partially aligning, BNNT molecular strands with each other within the BNNT material also generates enhanced friction surfaces. The transport of phonons along the BNNT molecules may be further enhanced by utilizing isotopically enhanced BNNTs. In particular, both $^{10}$B and $^{11}$B isotope enhancements to BNNT material improve phonon transport along the nanotube structures. It should be appreciated that a visco-elastically-enhanced BNNT material may include one or more enhancements to increase and/or direct the material's visco-elastic parameters. However, refinement can damage the BNNTs and the beneficial nodes between BNNTs, therefore increasing the importance of iteratively assessing the impact of a refinement process on the resulting viscoelasticity of the refined BNNT material. A refined BNNT material with minimal nanotube damage and minimal loss of inter-nanotube nodes can increase both the viscoelasticity and the structural integrity, to maintain the desired form factor.

Some embodiments of the present approach may take the form of a vibration damper comprising a compressed boron nitride nanotube (BNNT) buckyweave. The boron nitride nanotubes in the boron nitride nanotube buckyweave may have a partial alignment. In some embodiments, the BNNT buckyweave may be compressed in a direction perpendicular to the planar bulk alignment. In some embodiments, the BNNT buckyweave may be compressed in a direction parallel to the planar bulk alignment. The BNNT buckyweave may be formed from a plurality of boron nitride nanotube buckyweave layers. In some embodiments, one or more BNNT buckyweave layers may be compressed, e.g., prior to forming the buckyweave. In some embodiments, the BNNT buckyweave may be formed from stack of boron nitride nanotube buckyweave layers, e.g., stacked prior to weaving. The compressed BNNT buckyweave may, in some embodiments, be formed from a stack of compressed BNNT buckyweave layers. In embodiments formed from a stack of BNNT buckyweave layers, the layers may be stacked in a first direction, and is compressed in the first direction. In some embodiments, the stack may be compressed in a direction perpendicular to the first direction.

In some embodiments, the BNNTs in the BNNT buckyweave may have a cylindrical partial alignment about a long axis. For example, the BNNT buckyweave may be wrapped around a cylindrical body (such as a mandrel). The BNNT buckyweave may then be compressed in a direction parallel to the long axis. The compression may occur in a die, such that the resulting vibration damper has a desired form factor. For example, the compressed BNNT buckyweave may be circular, annular, polygonal, rectangular, and square (as viewed from the direction of compression).

The BNNT material may be visco-elastically enhanced. It should be appreciated that the BNNT buckyweave may be formed from a refined BNNT material. For example, the BNNTs in the BNNT buckyweave may be a BNNT material having a boron particle content of less than 50%, but greater than 0%, by weight of the BNNT material. As another example, the BNNTs in the BNNT buckyweave may be a BNNT material having a BNNT content of at least 40%, but less than 100%, by weight of the BNNT material. In some embodiments, the BNNTs in the BNNT buckyweave may be an isotopically-enhanced BNNT material, in which boron isotopes are about 96% $^{10}B$. In some embodiments, the BNNTs in the BNNT buckyweave may be an isotopically-enhanced BNNT material in which boron isotopes are about 98% $^{11}B$. A vibration damper according to the present approach may have a density selected for a particular application. For example, BNNT buckyweave vibration damper may have a compressed density of greater than about 0.1 g/cm$^3$ and less than about 1.1 g/cm$^3$. In some embodiments, the density may be between about 0.4 g/cm$^3$ and about 0.7 g/cm$^3$. In some embodiments, the density may be between about 0.5 g/cm$^3$ and 0.9 g/cm$^3$. The present approach also alleviates the need for a binder material in some embodiments. Thus, some embodiments do not contain a binder material. However, a binder material, such as boron oxide, may be used in some embodiments, without deviating from the present approach.

The vibration damper of any of claims 1-11, wherein where the final vibration damper contains a binder material It should be appreciated that some embodiments of the present approach may take the form of a method of forming a BNNT buckyweave vibration damper. A BNNT buckypaper may be formed by dispersing synthesized boron nitride nanotubes (BNNTs) in a dispersant, collecting the dispersed BNNTs on a substrate; and evaporating the dispersant. The BNNT buckypaper may then be weaved to form a BNNT buckyweave. The vibration damper may be formed by compressing the BNNT buckyweave. Some embodiments may include forming a plurality of BNNT buckyweaves, stacking the plurality of BNNT buckyweaves in a first direction, and compressing the plurality of BNNT buckyweaves. In some embodiments, the compression is in a direction parallel to the first direction. In some embodiments, the compression is in a direction perpendicular to the first direction. Some embodiments may include compression in more than one direction.

In some embodiments, the BNNT buckypaper may be separated into a plurality of strips, and the BNNT buckypaper may be formed by weaving the plurality of strips. In some embodiments, the BNNT buckyweave may be wrapped around a mandrel having a long axis, and compressed in a direction parallel to the long axis. The compression may occur in a die to form the compressed BNNT buckyweave in a desired form factor. The desired form factor may be, for example, circular, annular, polygonal, rectangular, square, or triangular (when viewed from the direction of compression). It should be appreciated that numerous form factors may be used without departing from the present approach.

Under the present approach, a vibration damper may include one or more viscoelastically-enhanced BNNT materials. For example, one or more impurities may have been removed from the synthesized BNNTs. A visco-elastically-enhanced BNNT material may be or include a BNNT material that has been refined to reduce an amount of at least one of boron particles, a-BN particles, h-BN nanocages, and h-BN nanosheets. As another example, the BNNT material may include enhanced concentrations of at least one of $^{10}B$ and $^{11}B$. The BNNT material may include a nanotube alignment, which may be a general alignment of nanotubes in a given direction. Partial alignment, as used herein, refers to an average alignment of the BNNT fibers in the bulk BNNT material, and is the alignment referred to herein. Nanotube alignment may result from synthesis, refining, and/or subsequent processing. For example, forming a BNNT buckypaper may generate an alignment in the plane of the buckypaper. Depending on the needs for a particular embodiment, the BNNT material may be compressed in a direction either generally perpendicular to the partial alignment, forming a BNNT pad, or generally parallel to the partial alignment, forming a BNNT pellet sometimes referred to as a BNNT plate.

Embodiments of the BNNT vibration damping material may be formed from woven BNNT buckypapers. Weaving BNNT buckypapers increases the structural integrity of the resulting BNNT buckyweave. The BNNT buckyweave may have a general nanotube alignment direction and be compressed either perpendicular to the alignment direction to form a BNNT pad, or parallel to the alignment direction to form a BNNT pellet. For example, strips of a BNNT buckypaper may be woven to form a BNNT buckyweave. The BNNT buckyweave may have a nanotube alignment direction, and may be compressed in a compression direction to form either a BNNT buckyweave pad or a BNNT buckyweave pellet. In some embodiments a BNNT yarn or BNNT fabric may be utilized. In some embodiments, a BNNT material may be wrapped around an object, and then compressed. The wrapping also improved the structural integrity of the resulting BNNT material, and the wrapped BNNT material may be compressed in a compression direction to form either a wrapped BNNT pad or a wrapped BNNT pellet. The compression can vary, depending on the desired properties. In some embodiments, the compressed BNNT material has a compressed density of about 1 to 3 orders of magnitude greater than the density of a synthesized BNNT material that is typically in the form factor of a puffball. The compressed density may be about 0.1 g/cm$^3$ to about 1.1 g/cm$^3$, and in some embodiments between about 0.4 g/cm$^3$ and about 0.7 g/cm$^3$, and in some embodiments, between about 0.5 g/cm$^3$ and about 0.9 g/cm$^3$.

In some embodiments, a BNNT vibration damper may be formed through compressing a BNNT material having a general nanotube alignment direction, either parallel or perpendicular to the alignment direction. The BNNT material may be or include a visco-elastically-enhanced BNNT material. Viscoelastic enhancement may be achieved through removing or reducing one or more impurities, as described herein and in the incorporated materials. Viscoelastic enhancement may also result from enhancing boron isotopes.

A BNNT material may be woven and/or wrapped, and compressed into a desired geometry, to improve viscoelastic performance. The BNNT material may take various forms, such as, for example, a BNNT pad or a BNNT pellet. As used in this disclosure, the term "BNNT mat" refers to a BNNT material formed from compressing synthesized BNNTs, in which the synthesized BNNTs have a nanotube alignment generally perpendicular to the compression direction. As used in this disclosure, the term "BNNT pellet" refers to a BNNT material formed from compressing synthesized BNNTs, in which the synthesized BNNTs have a nanotube alignment generally parallel to the compression direction. References made to nanotube alignment and general alignment herein relate to the bulk or average alignment within a BNNT material, and may result from the synthesis method (e.g., growing nanotubes in a given direction) and/or post-synthesis processing (e.g., forming a buckypaper). While nanotubes may have some degree of random orientation in a BNNT material, and individual nanotubes may have varying alignment along the nanotube length, the bulk or average alignment of a BNNT material may be identified through one or more known methods in the art including imaging by scanning electron microscope (SEM), and/or based on the synthesis method and/or post-synthesis processing. It should be appreciated that these definitions do not have any impact on prior uses of the terms BNNT pad, BNNT pellet and BNNT plate, unless stated otherwise.

Embodiments of the present approach include a BNNT material formed into a BNNT "buckyweave," in which one or more individual strips of one or more BNNT buckypapers are woven together. It should be appreciated that weaving patterns may be selected based on the desired configuration and the needs of a given embodiment. Weaving and/or wrapping the BNNT material beneficially improves the BNNT material's ability to remain assembled with its structural integrity, and maintain preferred partial alignment. Weaving, wrapping, and/or compressing may be used to form BNNT pads and/or BNNT pellets.

An important characteristic of viscoelastic materials is their storage modulus, i.e. stiffness. Selection of synthesis parameters of the visco-elastically-enhanced BNNT material and the assembly processes going into making BNNT pads and BNNT pellets, may be tailored to adjust the storage modulus and Tan δ of the final pad or pellet. For example, if high or very high pressures (e.g., compression pressures in excess of 10 MPa and up to 50 MPa; for high pressures and very high pressures include pressures in excess of 50 MPa) are used in compressing the BNNT material into the mats, then the storage moduli are altered. If the BNNT material is aligned and/or woven into a selected geometry, the storage moduli may be either raised or lowered, depending on the geometry. The storage moduli can have preferred dependencies on the average pressure applied to the BNNT material both in its assembly and in its usage, and on the controlled alignment of the BNNTs within the BNNT material.

The BNNT molecular strands that form the visco-elastically-enhanced BNNT material may be made into threads and yarns that may incorporate multiple threads that, in turn, may be made into ropes and fabrics. The alignment of the BNNT molecular strands may be enhanced with these different forms thereby enhancing the mechanical resilience and structural integrity of the final BNNT material, such as a BNNT pad or BNNT pellet, and enhancing the viscoelastic properties for vibration damping. BNNT buckyweaves can be used to both create partial alignment of the BNNT strands in a desired direction, and to enhance structural integrity in the BNNT material.

The present disclosure relates to a vibration damper that includes a visco-elastically-enhanced BNNT material. The visco-elastically-enhanced BNNT material may include: (1) an synthesized BNNT material that has been refined to reduce an amount of at least one of boron particles, a-BN particles, h-BN nanocages, and h-BN nanosheets; (2) an isotopically-enhanced BNNT material; and/or (3) a compressed BNNT material. In some embodiments, the isotopically-enhanced BNNT material may include an enhanced concentration of $^{10}$B and/or $^{11}$B. Currently commercially available materials are at greater than 96 wt % for $^{10}$B and greater than 98 wt % for $^{11}$B. In some embodiments, the compressed BNNT material has a compressed density of about 1 to 3 orders of magnitude greater than the density of a synthesized BNNT material. In some embodiments, the visco-elastically-enhanced BNNT material includes at least one of a BNNT thread, a BNNT yarn, a BNNT pad, and a BNNT fabric. The visco-elastically-enhanced BNNT material may include a plurality of BNNT pads and/or a plurality of stacked BNNT pads. In some embodiments, the synthesized BNNTs, woven BNNT buckypaper(s), BNNT buckyweaves, and/or wrapped BNNT buckypaper(s), may be compressed. The result is enhanced viscoelastic vibration damping properties, and structural integrity for the embodiment.

The present disclosure also relates to methods of forming a vibration damper having a BNNT material, which may be a visco-elastically-enhanced BNNT material. The method may include visco-elastically enhancing the BNNT material through at least one of: refining the BNNT material; aligning BNNTs in the BNNT material; isotopically enhancing the BNNT material; increasing the density of the BNNT material; increasing the alignment of BNNT strands relative to the direction of vibration; and weaving or wrapping the BNNT material to enhance the material's integrity when under pressure, and to create pressure-dependent viscoelastic effects. In some embodiments, the method of refining the BNNT material includes at least partially removing from the BNNT material at least one of boron particles, a-BN particles, h-BN nanocages, and h-BN nanosheets. In some embodiments, the method of aligning BNNTs in the BNNT material includes forming at least one of a BNNT yarn and a BNNT thread. In some embodiments, isotopically enhancing the BNNT material comprises enhancing the presence of $^{10}$B and/or $^{11}$B. In some embodiments, increasing the density of the BNNT material includes one of: (1) compressing the BNNT material, and (2) dispersing the BNNT material in a dispersant and separating the dispersed BNNT material on to a filter membrane, and evaporating a dispersant from BNNTs placed into a desired geometry. In some embodiments, the dispersant is an alcohol such as methanol, ethanol or isopropyl alcohol. In some embodiments, a BNNT thread and/or a BNNT yarn is made into at least one of a rope and a fabric. The method of forming a vibration damper having a BNNT material may further include compressing the BNNT thread and/or BNNT yarn. The method may include forming a plurality of BNNT pads and stacking the plurality of BNNT pads. The method may also include wrapping the BNNT yarn around a mandrel to form a cylindrical BNNT mat. The method may also include weaving a BNNT thread, a BNNT yarn or a BNNT buckyweave into a BNNT fabric.

The present disclosure also relates to a vibration damping system that includes a housing containing a visco-elastically-enhanced BNNT material. In some embodiments of the vibration damping system, the BNNT material includes at least one of a refined BNNT material, an isotopically-enhanced BNNT material, a compressed BNNT material, a BNNT mat, a BNNT yarn, a BNNT weave, and a BNNT thread.

DETAILED DESCRIPTION

Figure 1:
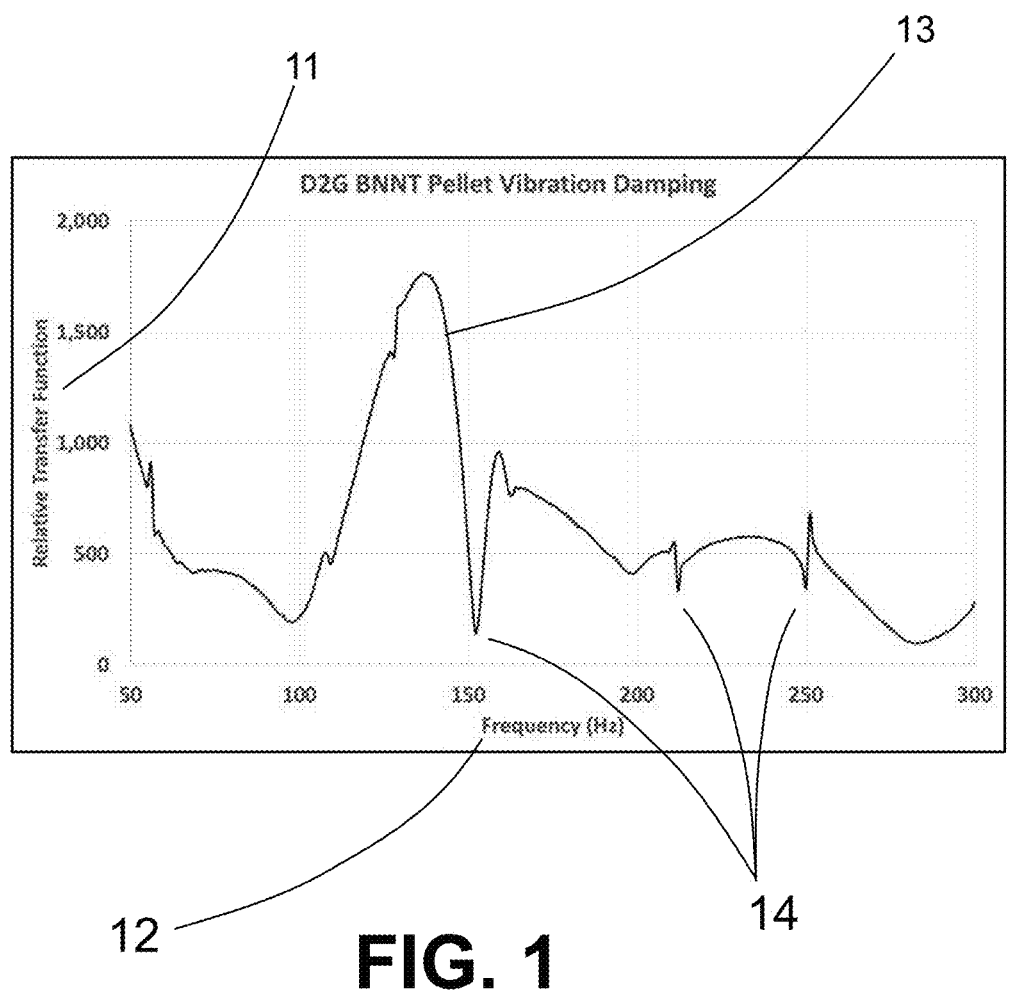
FIG. 1 shows the relative transfer function of a BNNT pad.

The following description includes the currently contemplated modes of carrying out exemplary embodiments of the present approach. The following description is not to be taken in a limiting sense, and is made merely for the purpose of illustrating the general principles of the invention.

As used herein, the term "BNNT" refers to boron nitride nanotubes. Generally, BNNT structures may be formed by thermally exciting a boron feedstock in a chamber in the presence of nitrogen gas at an elevated pressure. Unlike carbon nanotubes (CNTs), U.S. Pat. No. 8,206,674 to Smith et al, indicates that BNNTs form without the presence of chemical catalysts, and preferably at elevated pressures of about 2 atm to about 250 atm. CNTs, on the other hand, typically require the presence of chemical catalysts such as metal catalysts. Lower quality BNNTs, having 10-50 walls, frequent defects in nanotube structure, and lower aspect ratios, can be synthesized using catalysts, but it has been shown that high quality BNNTs do not form in the presence of such catalysts, indicating that the formation of BNNTs is fundamentally different than the formation of CNTs.

The term "synthesized BNNTs" refers to BNNTs synthesized using one or more methods known in the art. The following patents are identified as non-limiting examples of BNNT synthesis methods, though it should be understood that other synthesis methods may be used to form synthesized BNNTs under the present approach. U.S. Pat. No. 8,206,674, issued Jun. 26, 2012, referenced above, is incorporated by reference in its entirety. U.S. Pat. No. 8,753,578, issued Jun. 17, 2014, discloses a laser-driven process for producing BNNTs, and is incorporated by reference in its entirety. U.S. Pat. No. 9,776,865, issued Oct. 3, 2017, describes a BNNT synthesis process using induction-coupled plasma, and is incorporated by reference in its entirety. U.S. Pat. No. 10,167,195, issued Jan. 1, 2019, describes a process for synthesizing continuous BNNT fibers, and is incorporated by reference in its entirety. U.S. Pat. No. 10,442,691, issued Oct. 15, 2019, describes a BNNT synthesis process using direct induction, and is incorporated by reference in its entirety.

The term "refined BNNT material" refers to synthesized BNNTs that have been processed to remove one or more non-BNNT species from the synthesized BNNTs. BNNTs produced by high temperature or high temperature high pressure methods typically are high quality, i.e., the number of walls range from one to ten (with most being two-walled and three-walled), the length-to-diameter ratios are typically ten thousand to one or higher, the BNNTs are free of catalysts, and the BNNTs are highly crystalline with very few defects (less than one defect per one hundred diameters of length). Such high quality synthesized-BNNTs are preferred under the present approach, as those material characteristics are more suitable for vibration damping application. However, small particles of boron, amorphous boron nitride (a-BN), hexagonal boron nitride (h-BN) nanocages, and h-BN nanosheets may be present. These small particles are typically tens of nanometers (nm) in scale but may be smaller or larger depending on the manufacturing process. Depending on synthesis conditions, boron particles may account for 5-95 percent of the mass of the synthesized BNNT material, and the additional non-BNNT species content will heavily depend on the synthesis method. In preferred embodiments of the present approach, boron particles comprise less than 50% by weight of the refined BNNT material, and BNNTs comprise over 40% of the refined BNNT material. In some embodiments, boron particles comprise less than 40% by weight of the refined BNNT material, and in some embodiments, less than 30% by weight, and in some embodiments, less than 20% by weight, and in some embodiments, less than 10% by weight. In some embodiments, BNNTs comprise over 45% by weight of the refined BNNT material, and in some embodiments, more than 50% by weight, and in some embodiments, more than 55% by weight, and in some embodiments, more than 60% by weight. International Patent Application No. PCT/US17/63729, filed Nov. 29, 2017, provides examples of refinement processes that may be used to reduce the non-BNNT species content, and increase the BNNT content, of synthesized BNNTs, and is incorporated by reference in its entirety.

Typically for the embodiments described herein, the refining temperature, pressure, flow rates of the water vapor, nitrogen gas and oxygen gas, and the exposure time utilized in this process are kept in regimes where the bulk of the species that are removed are exposed boron particles, leaving other species relatively unaffected. A method to determine when the multi-parameters involved have been appropriately achieved is to process the material at a steady temperature, pressure, and flow rate of water vapor, nitrogen, and oxygen, and vary the exposure time. The person having ordinary skill in the art can use design of experiment to vary one or more other variables, and repeat the test. When increasing the exposure time no longer reduces mass and external boron particles or boron oxide particles are not observed via standard chemical analysis, then the refinement parameters may be suitable for a given synthesized BNNT embodiment. Typically if the temperature is too high, the mass will continuously decrease with time as the multiple BN allotropes present in the synthesized BNNTs are removed. These same general parameters also apply to acid-based processes for refining synthesized BNNT materials. For example, often weak nitric acid that is sometimes heated will refine synthesized BNNT materials. However, if the temperature is too high, the acid concentration is too high, and/or the exposure time is too long then the BN allotropes will be removed as well. Nitric acid and similar acid-based process are not preferred in the preferred approach for generating visco-elastically-enhanced materials, as it is more difficult to remove the exposed boron particles without damaging the BN allotropes and fully removing the nitric acid or other acids from the refined BNNT material is not always possible. A further complexity is that for some forms of synthesized BNNT material, partial removal of some of the BN allotropes may enhance the viscoelastic properties. Consequently, the final step in determining whether the refining process has been optimized for a given embodiment of synthesized BNNT material is to measure the viscoelastic properties of the resultant material and to check their ability to be formed into BNNT pads and pellets as described herein, with adequate structural integrity to hold together when utilized.

The term "partial alignment," as used herein, refers to an average alignment of the individual nanotubes, sometimes also referred to as BNNT fibers or BNNT staples, in the bulk BNNT material. For example, BNNTs formed into a BNNT buckypaper as described herein will have a partial alignment in the plane of the filter paper, even though nanotubes will frequently have bends, twists, and turns along their length.

The term "network staple length," as used herein, refers to the interconnected network of nanotubes and nodes of the BNNT material that determines the effective staple length for weaving the BNNT material.

The term "BNNT pad," as used herein, refers to any form of BNNT material, which may be either a synthesized BNNTs or a refined BNNT material, which has been compressed in a direction perpendicular to the direction of partial alignment of the BNNT material.

The term "BNNT pellet," as used herein, refers to any form of BNNT material, which may be either a synthesized BNNTs or a refined BNNT material, which has been compressed in a direction parallel to the direction of partial alignment of the BNNT material.

The term "BNNT mat," as used herein, refers to any form of compressed BNNT material, which may be either a synthesized BNNTs or a refined BNNT material, wherein the direction of partial alignment is predominantly in the predominant plane of the mat.

The term "BNNT buckypaper," as used herein refers to a BNNT material, which may be either a synthesized BNNTs or a refined BNNT material, which has been dispersed in a dispersant, collected on a filter, and then dried to leave a paper-like sheet of BNNTs on the filter. The dispersant may be a liquid, such as an alcohol (e.g., methanol, ethanol, isopropyl alcohol). The dispersant may be removed through drying processes, leaving the dispersed BNNT material on a filter membrane as a BNNT buckypaper. The thickness of the BNNT buckypaper will depend on the volume of BNNTs collected on the filter, as well as the filter surface area. The BNNTs in the BNNT buckypaper will have a planar partial alignment parallel to the filter.

The term "BNNT buckyweave" as used herein refers to at least one BNNT buckypaper that has been folded at least once into a single material, and preferably more than once, and in preferred embodiments, is woven into a fabric or shape suitable for compression into the desired form factor. In some embodiments, the BNNT buckypaper may be cut into thin strips or lengths for weaving, and the BNNT buckyweave is comprised of a plurality of interwoven BNNT buckypaper strips. In some embodiments, the BNNT buckypaper need not be cut into strips. For example, the BNNT buckypaper may be formed in thin strips or lengths for weaving, using customized filter paper in the shape of the desired strips or lengths, and the BNNT buckyweave is comprised of a plurality of interwoven BNNT buckypaper strips. As another example, the BNNT buckypaper may be formed as a single long strip or length, that may be folded upon itself once (or more), such as in a series of 45-degree bends, to form a linear BNNT buckyweave from a single length.

There are several types of weaving patterns, but the present approach is not limited to any particular weaving pattern unless so specified in a claim, and there are numerous variations in folding and weaving patterns that may be used without departing from the present approach. Plain weave is the most basic type. When weaving plain weave, the material lengths are aligned to form a generally crisscross pattern. Each length crosses the other in an alternating pattern. "Basketweave" is a type of plain weave in which two or more threads are grouped and then woven. Twill is a type of weave that has a pattern of diagonal parallel ribs. This pattern requires one length to cross over one or more lengths, and then under two or more lengths, and so on. The next length does the same, but also crosses over prior lengths to create a diagonal pattern.

The term "form factor" as used herein refers to the shape of a BNNT vibration damper, which will vary depending on the ultimate application of the vibration damper. For example, some embodiments may employ a cylindrical form factor, whereas some embodiments may call for a flat, wafer-like vibration damper.

BNNTs, and particularly high quality BNNTs, have exceptional viscoelastic behavior. This behavior results from BNNT molecules rubbing against one another. The polar boron-nitrogen bonds in BNNTs are partially ionic in character and are believed to produce nanoscale friction that generates phonons in (and between) the BNNT molecules that dissipate the vibration energy as heat. Carbon nanotubes (CNTs) do not exhibit this behavior because their carbon-carbon bonds are non-polar, not ionic, and the carbon atoms of one CNT easily slide against the carbon atoms of another CNT.

BNNTs, and in particular a BNNT material in various configurations such as those disclosed herein, provide enhanced viscoelastic performance. BNNT material may be processed into desired configurations for use as a vibration damping material. Such uses require sufficient structural integrity within the BNNT material, particularly with respect to embodiments having more than one layer of BNNT material. A BNNT buckypaper may, for some synthesized BNNTs, result in sufficient structural integrity, but the relatively thin nature of a BNNT buckypaper is likely inadequate for most form factors. As described herein, compressing the BNNT material improves viscoelasticity, and a single BNNT buckypaper does not benefit from compression optimization. Stacking multiple BNNT buckypapers may generate sufficient thickness for compression, but the lack of structural integrity between layers may be insufficient for most embodiments. Forming one or more BNNT buckyweaves, however, overcomes the structural integrity challenge, and presents an efficient solution for a wide variety of vibration damper applications.

In some embodiments, configurations include a visco-elastically-enhanced BNNT material that comprises one or more of refined BNNTs, aligned BNNTs, isotopically enhanced BNNTs, and density controlled BNNT material. Reducing the amounts of boron particles, a-BN particles, h-BN nanocages, and h-BN nanosheets alters the amount of BNNT surface area present, thereby altering nanoscale friction that generates the viscoelastic behavior. Thus, in some embodiments one or more of boron particles, a-BN particles, h-BN nanocages, and h-BN nanosheets may be minimized or removed from a BNNT material to enhance the BNNT material's viscoelastic behavior. Aligning BNNT molecular strands with each other within the BNNT material also generates enhanced friction surfaces. Thus, increasing the relative alignment of BNNTs within a BNNT material enhances the BNNT material's viscoelastic behavior as described in International Application No. PCT/US2018/017231, filed Feb. 7, 2018, incorporated by reference in its entirety.

BNNT material has several valuable properties. The density of the synthesized high temperature method BNNT material is typically about 0.5 to 4.0 grams per liter (0.5-4.0 g/L) but easily varies by +/−50%. At this density, the synthesized BNNT material has the appearance of a puffball. The density of the BNNT material may be increased to enhance the BNNT material's viscoelastic properties. For example, a BNNT material may be compressed using techniques known in the art to increase the density by about 1-3 orders of magnitude relative to the density of the synthesized BNNT material and some embodiments beyond this value. For example, a BNNT material may have a density of about 0.5-4.0 g/L after synthesis, and may be compressed until the density is as high as about 1,000 g/L, or above in some embodiments, to form a visco-elastically-enhanced BNNT material. It should be appreciated by those of ordinary skill in the art that various compression techniques may be used. Examples include, but are not limited to, include flat area compression, forming the BNNT material into yarns and then twisting the yarns to provide both compression and aligned compression in the direction of the yarns, and, in some embodiments, helically around the yarns, and in weaving the yarns or buckyweaves into fabrics or other geometries where the compression in one direction can be different from the compression in a second direction. After compression, the BNNT material typically remains close to its compressed shape and density. Depending on the compressed BNNT material's geometry or form factor, the compressed BNNT material may be referred to as a BNNT pad (i.e., for planar geometries where the direction of compression is predominantly perpendicular to the plane of alignment or partial alignment of the BNNT material) or BNNT pellet (e.g., for rounded, spherical, cylindrical, or rectangular geometries, where the direction of compression is predominantly parallel to the plan of alignment or partial alignment of the BNNT material).

In some embodiments, refined BNNT material may have over 70% of the boron particles removed, and in some embodiments, over 90% of boron particles removed, leaving less than 2 wt % of boron particles that are not encased in h-BN nanocages and typically half or even none of the a-BN particles, h-BN nanocages, and h-BN nanosheets removed. As a result, embodiments of refined BNNT material prior to compression or processing into buckypapers typically have densities of about one-half to one-tenth of the synthesized BNNTs, though the density may fall outside of this range for some embodiments, depending on the synthesis and refining processes. The surface area of the synthesized high quality BNNT material, prior to removal of any impurities resulting from synthesis, is typically in the range of about 100-200 $m^2/g$, and sometimes above 200 $m^2/g$, depending on the choice of synthesis parameters. The surface area of the refined BNNT material typically ranges from 150 to 500 $m^2/g$, though the surface area may fall outside of this range for some embodiments, depending on the synthesis and refining processes. Typically, the boron particles contribute less than 10% of the surface area of the BNNT material, so boron removal can result in the refined material having an increase in the surface area. Also, boron particles typically contribute about 5% to about 60% of the mass of the synthesized BNNT material, and as a result removing a significant amount of boron particles can increase the surface area of the BNNT material. It should be appreciated that the change depends on the boron content of the synthesized BNNTs, as well as the synthesis and refining processes. A visco-elastically-enhanced BNNT material may be a refined BNNT material, i.e., a BNNT material that has been processed to remove or reduce at least a portion of boron particles, a-BN particles, h-BN nanocages, and/or h-BN nanosheets. The stiffness (storage modulus) is an important characteristic of viscoelastic materials. Acting as a damped spring, both the damping and the stiffness of the viscoelastic material are important for different applications. A BNNT material may be formed into a configuration suitable for use as a vibration damper. Example configurations include a BNNT pad and a BNNT pellet. FIG. 1 shows the relative transfer function 11 of an approximately 350 mg cylindrical BNNT pellet, having a diameter of about 1.0 cm, formed from a refined BNNT material that was refined to remove the bulk of exposed boron particles, and less than 5% of the non-BNNT BN allotropes present in the synthesized BNNTs. The BNNT pellet embodiment used for generating the data in FIG. 1 was refined D2G, described below, BNNT material that had roughly 20% of its synthesized mass reduced by the refining process to remove a significant portion of boron particles, but with minimal removal of other forms of BN discussed above. The refined D2G material was then made into circular BNNT buckypapers as described herein, cut into strips, woven into a BNNT buckyweave, and then compressed. The compression took place in a die to provide the maximum radial extent of the resultant BNNT pellet, through applying about 10 MPa pressure along an axis generally parallel with bulk nanotube orientation or partial alignment, with a resultant cylindrical height of about 7.8 mm. This process is also described in the discussion of FIG. 7, below. The BNNT pellet experienced forced oscillations along its axis while supporting a 1.57 kg mass experiencing an average pressure of 1.78 MPa at room temperature. Average pressure is the average force on the pad in the direction of compression divided by the area of the pad experiencing the average force.

Synthesized BNNT material may be refined through processes such as those described in International Patent Application No. PCT/US17/63729, filed Nov. 29, 2017, and incorporated by reference in its entirety. BNNT material may also be shaped into a desired geometry, such as described in International Patent Application No. PCT/

US2015/027570, filed Apr. 24, 2015 and incorporated by reference in its entirety. The value of the transfer function 11 varies with frequency 12. The height, width, and position of the resonant peak 13 allows extraction of the loss tangent conventionally referred to as Tan δ and the storage modulus of the cylindrical BNNT pad or BNNT pellet. Several parasitic resonance structures 14 are seen in the Relative Transfer Function 11 across the range of frequencies 12. For the embodiment shown in FIG. 1, the viscoelastic properties were measured at 2 K on a D2G BNNT pellet with the 1.57 kg test system at 1.78 MPa average pressure placed in a 2 K dewar, the Tan δ is 0.23 and the storage modulus is 80 MPa. The larger the value of Tan δ, the more viscoelastic the material is, and the higher the storage modulus the higher the frequency of the resonant peak 13 for a given geometry or size of the material and associated mass connected to the material as those skilled in the art of damped harmonic motion should appreciate.

As mentioned above, BNNT material may be synthesized in a variety of formats. Incorporated by reference in their entirety are U.S. Pat. Nos. 9,776,865, 9,745,192, International Patent Application No. PCT/US2015/027570, filed Apr. 24, 2015, and International Patent Application No. PCT/US2016/23432, filed Mar. 21, 2016. High quality BNNT materials, such as those described herein, provide higher performance values for the loss tangent and for control of the storage modulus, at least due to the higher surface area of polar and partially ionic bonds that can generate friction with vibrating.

Figure 2:
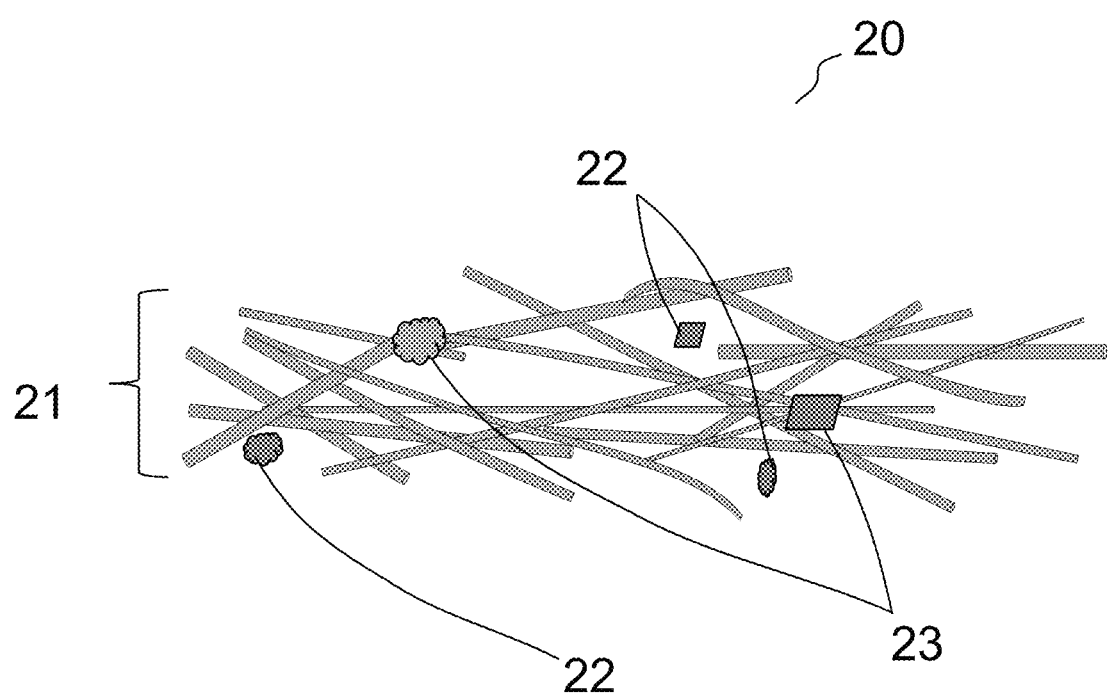
FIG. 2 illustrates a pad composed of BNNT molecular strands including non-BNNT impurities.

FIG. 2 illustrates BNNT strands 21 and particles of boron, a-BN, h-BN nanocages 22, and h-BN nanosheets 23 compressed into a layer to form a BNNT pad 20. Simple compression of the BNNT material creates some alignment perpendicular to the direction of compression. Minimizing the amount of particles of boron, a-BN, h-BN nanocages 22, and h-BN nanosheets 23 by refinement affects the loss tangent. Some h-BN nanosheets 23 join to BNNTs and may advantageously help maintain the open structure of the compressed BNNT material. Thus, the BNNT material may be synthesized and refined to meet the particular needs of a given embodiment. As an example, variables as observed with Transition Electron Microscopy (TEM) including their number of walls (generally, fewer is better), nanotube bulk diameters (generally, smaller is better) and nanotube crystallinity. With respect to number of walls, bulk diameter, and crystallinity, it should be appreciated that those variables may be estimated through visual analysis of TEM imagery. Of course, it should also be appreciated that there may be some variation with respect to the values determined. These may be approximations, and the scope of this disclosure is not intended to be limited to any specific approximation or value unless clearly stated in the appended claims.

As a further example, the synthesis process and/or the level and type of refinement may be selected to control the amounts of non-BNNT BN allotropes, e.g., to minimize the amount of particles of boron and a-BN, to control the average size and amount of h-BN nanocages (generally, fewer and smaller is better), and to control the average size, amount, and distribution of h-BN nanosheets. For example, the BNNT refining, also known as purification, processes such as those described in International Patent Application No. PCT/US17/63729, filed Nov. 29, 2017, and incorporated by reference in its entirety, may be used to reduce the amount of boron particles exposed to the surface to below one percent mass of the material. In some embodiments, high quality BNNTs, i.e. the number of walls range from one to ten (with most being two-walled and three-walled), the length-to-diameter ratios are typically ten thousand to one or higher, the BNNTs are catalyst free, and the BNNTs are highly crystalline with very few defects (less than one defect per one hundred diameters of length), will be preferred for the BNNT material.

Table 1 lists four types of synthesized BNNTs commercially available from BNNT, LLC, along with approximate boron content by mass and a listing of the most dominant allotrope present ("primary"), and the second most common allotrope present ("secondary").

TABLE 1

| BNNT materials synthesized at BNNT, LLC. | | |
|---|---|---|
| BNNT material | Nano h-BN allotropes (primary, secondary) | Approx, boron impurities |
| D2 | Tubes, cages | 30% |
| Q0 | Sheets, tubes | <5% |
| Q1 | Tubes, sheets | 25% |
| Q2 | Tubes, cages | 40-50% |

Figure 3:
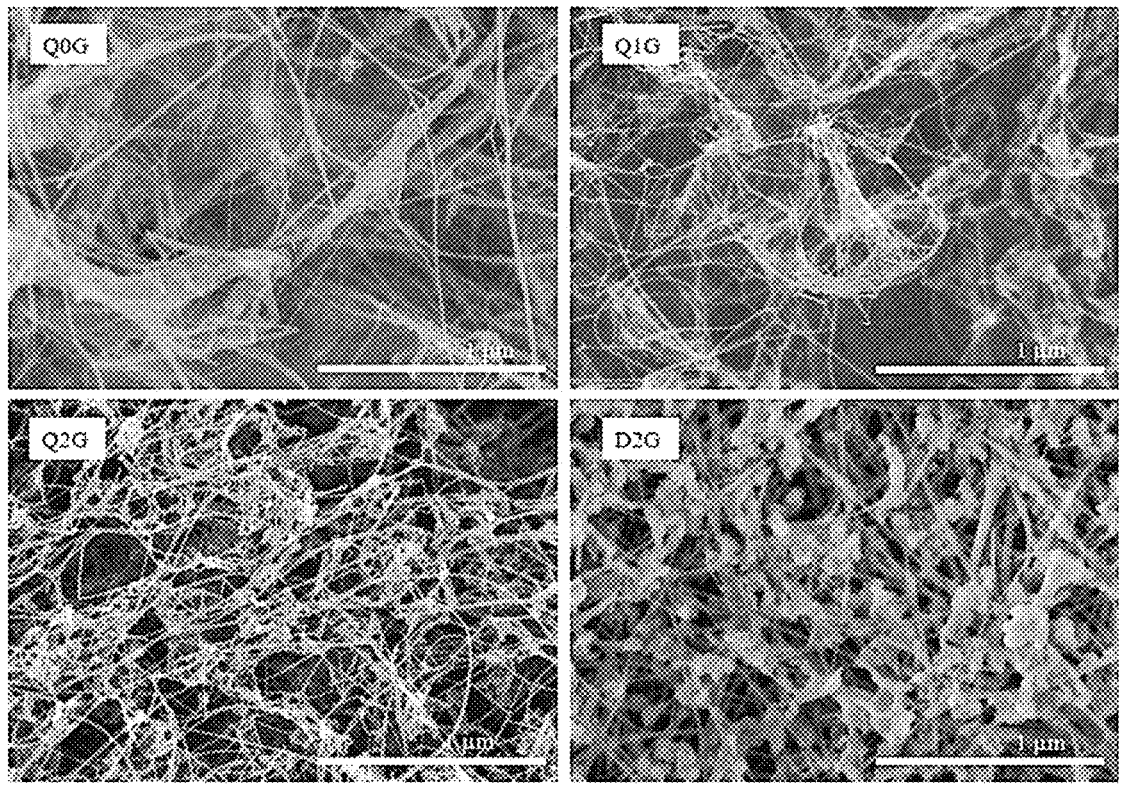
FIG. 3 shows SEM and TEM images of different BNNT material embodiments.

As-synthesized BNNT material is referred to as "beta" and refined material is referred to as "gamma." For short hand, Q2 beta is referred to as Q2B and the refined Q2 gamma material referred to as Q2G, and similarly for the other versions. FIG. 3 shows SEM images of Q0G (upper left), Q1G (upper right), Q2G (lower left) and D2G (lower right) of embodiments of refined BNNT materials. As is seen in the images, the morphology changes from material to material as listed in Table 1. An important aspect of the morphology are the nodes where multiple BNNT nanotubes frequently join together as seen in the images in FIG. 3. The ability of the refined BNNT material to keep its integrity under the processing (e.g., into BNNT buckypapers, buckyweaves, pad, or pellets) depends on retaining these nodes and retaining the length of the BNNT nanotubes. This interconnected network of nanotubes and nodes determines the effective staple length, referred to herein as network staple length, of the BNNT material going into the BNNT pad or BNNT pellet. Both under and over refinement can be detrimental to optimal vibration damping performance structural performance if the network staple lengths are adversely effected. As those skilled in the art will appreciate, the details of the refinement process parameters and the resultant refined BNNT material will change with the chemicals, temperatures, pressures, times, including times at specific chemical, temperature and pressure conditions. Further, material synthesized with different conditions will frequently require different detailed refining parameters, and as indicated all of these effect the network staple lengths and viscoelastic properties of the material. In some embodiments, the process for refining synthesized BNNTs includes (1) heating the BNNT material to a first temperature and for a first duration, in the presence of an inert gas and a hydrogen feedstock to remove boron impurities; optionally (2) heating the BNNT material at a second temperature for a second duration, to remove boron nitride impurities; and, optionally, (3) heating the BNNT material at a third temperature for a third duration, to remove boron oxide impurities. The third stage may be omitted in some embodiments, allowing residual boron oxide to act as a binder. For removing boron impurities, the temperature may preferably be about 500-650° C., and the as-synthesized material may remain in a chamber at the temperature for a given time, preferably about 0.16-12 hours, and more preferably about 0.5-5 hours. In some embodiments, the inert gas may include nitrogen, or it may consist of nitrogen, or it may consist essentially of nitrogen. In some embodiments, the hydrogen feedstock may be at least one of water vapor and hydrogen gas. In some embodiments, the amount of water vapor in the nitrogen gas may be controlled by using a dry nitrogen gas and bringing the dry nitrogen gas to saturated water vapor conditions at a temperature of 30-100° C., for example. For removing boron nitride impurities, the temperature may be raised to a second temperature, preferably about 650-800° C., and the second duration is preferably about 0.16-12 hours, and more preferably about 0.5-5 hours. For removing boron oxide impurities, the temperature may be lowered to a third temperature, preferably about 500-650° C., and the third duration is preferably about 0.16-12 hours, and more preferably, about 0.5-5 hours. It should be appreciated by those of ordinary skill in the art that the temperatures, durations, and gas flow and pressure parameters vary depending on the particular synthesized BNNT material. For example, the BNNT pellets used for FIGS. 1, 9, 10, 11, 14, and 15, were formed from a synthesized BNNT material that was refined to remove boron impurities using refining temperatures greater than 500° C. and less than 625° C., and refining times greater than 0.5 hour, and less than 1 hour.

Figure 4:
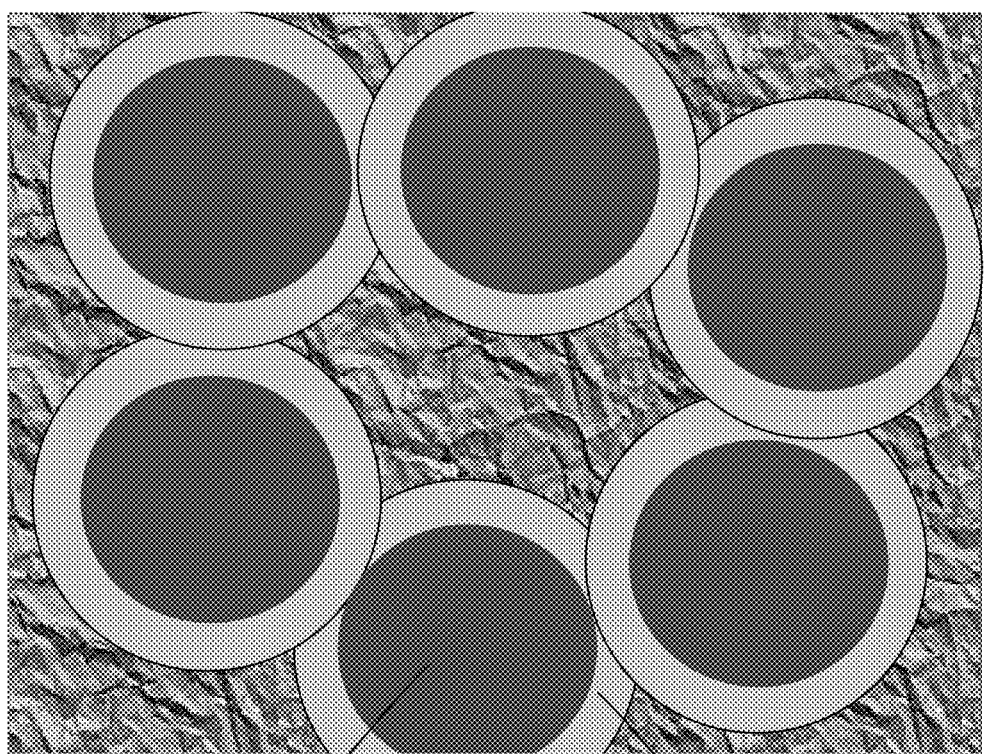
FIG. 4 shows BNNT buckypaper embodiments.

In some embodiments, mats of visco-elastically-enhanced BNNT material may be formed into a desired geometry or form factor (e.g., size and shape). A BNNT material may be synthesized into the desired geometry, and/or processed post-synthesis to attain the desired geometry. In preferred embodiments, the BNNT material is formed into a BNNT buckypaper. Methods include, but are not limited to: compression of synthesized BNNT material; formation from buckypapers that are made by dispersing BNNT material in a liquid such as an alcohol such as methanol, ethanol or isopropyl alcohol (IPA) and then separating the dispersed BNNT material on to a filter membrane such as those described in International Patent Application No. PCT/US17/63729, filed Nov. 29, 2017; and evaporating a dispersant, such as an alcohol, from BNNTs placed in a form, and the several embodiments of forming BNNT yarns and fabrics discussed above. Some embodiments will employ a BNNT pad such as those described in International Patent Application No. PCT/US17/63729, filed Nov. 29, 2017. FIG. 4 shows an embodiment of Q2G BNNT buckypapers (2.6 mg/cm2; 70 mm diameter) on filter papers ready for cutting and assembly into vibration damping mats. The darker inner regions are the BNNT buckypapers 41 and the lighter outer regions are the filter papers 42.

Figure 5:
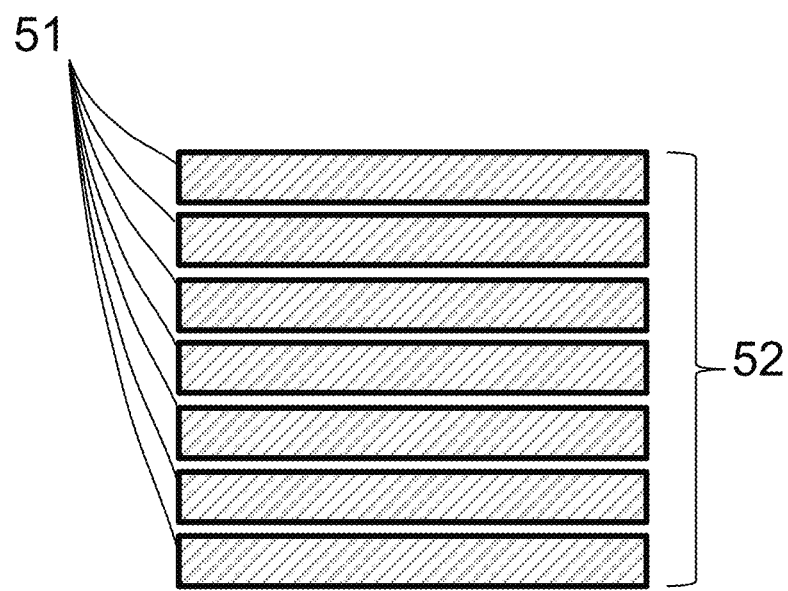
FIG. 5 illustrates multiple BNNT pads stacked to make a larger BNNT pad according to an embodiment.
Figure 6:
FIG. 6 shows a BNNT pad made of stacked BNNT buckypaper cutouts that has separated.

As illustrated in FIG. 5, multiple BNNT mats 51 may be stacked to create a thicker BNNT pad 52. If already compressed, BNNT mats 51 may be considered pads or pellets (depending on the compression direction relative to the partial alignment). For a vibration perpendicular to the plane of the mats, the thicker mats result in a reduced compressive spring constant, e.g. if the mat is twice as thick it only takes half the force to compress the mat the same distance. In applications, this lowers the lowest frequency for effective damping and in this example of a doubling of the thickness the lowest effective damping frequency would be reduced by a factor of the square root of two. However, compressing synthesized BNNTs, which are normally puffballs, into mats, or compressing layers of BNNT buckypapers and then stacking the compressed puffballs or buckypapers into a multilayer stack, has two major issues for performance. First, the resultant stacked mats typically lack structural integrity—they will not stay assembled and they fall apart with handling, failing too quickly for meaningful use. Second, the resultant Tan δs are typically 20 to 50 percent lower than the optimized pads and pellets being herein disclosed. FIG. 6 shows a BNNT pad made from stacked cutouts of BNNT buckypaper that has fallen apart after brief use because the buckypapers do not adhere adequately to provide the structural integrity. Simple stacking is not an effective technique for providing structural integrity.

Figure 7:
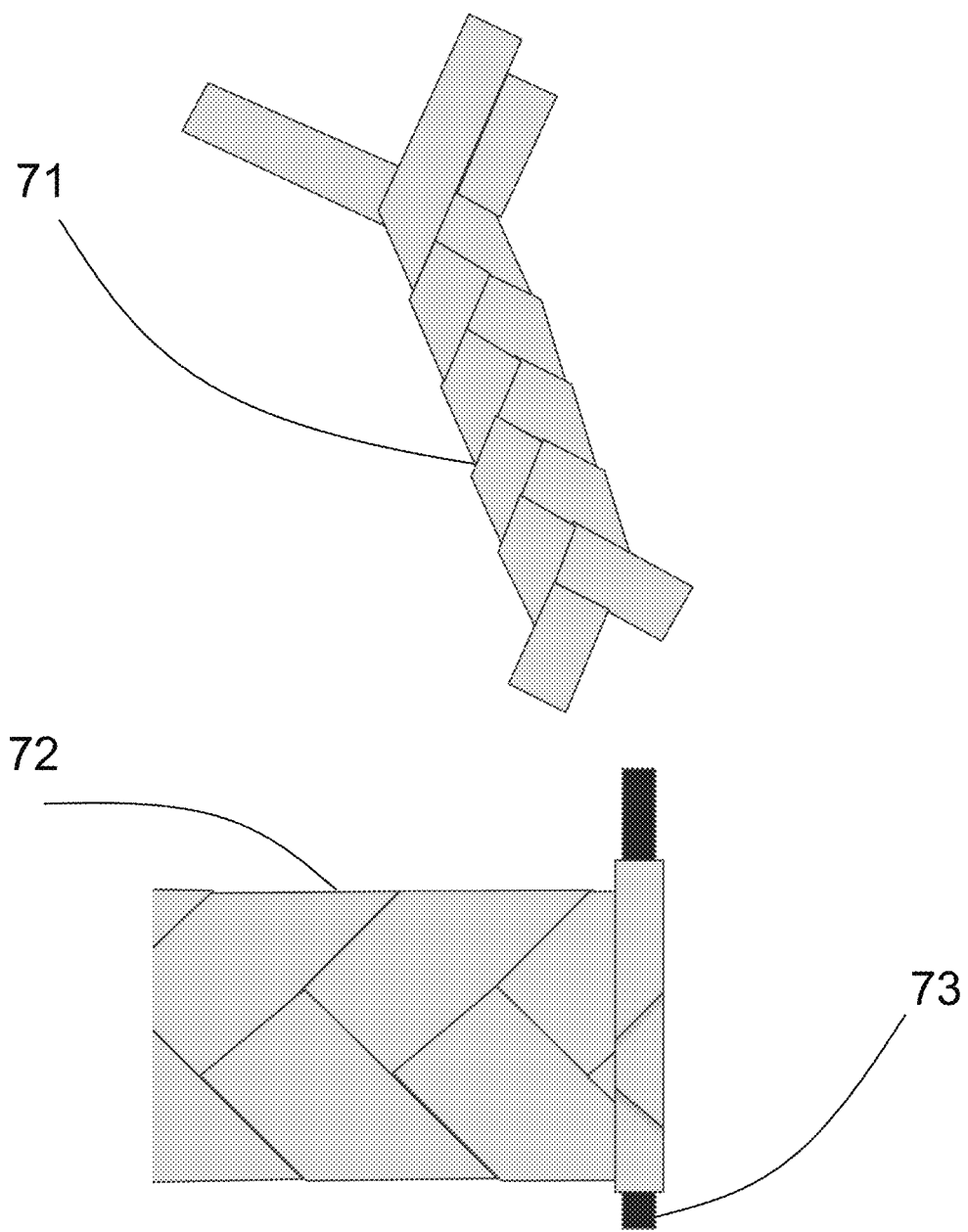
FIG. 7 shows an embodiment in which strips from BNNT buckypapers are woven into BNNT buckyweaves, a form of BNNT material that may be used to form larger BNNT pads and BNNT pellets.

BNNT buckyweaves advantageously overcome many of these challenges. In some embodiments of the present approach, a BNNT buckyweave may be formed from one or more BNNT buckypapers. The BNNT buckypaper is cut into strips or lengths, and woven into BNNT pads 71, forming what this disclosure refers to as a BNNT buckyweave 71, as shown in FIG. 7. Weaving, e.g., interlacing two or more lengths by folding one length over another, may occur through mechanical manipulation, among other techniques known in the art for weaving strips of flexible material into a desired weave pattern. The process of collecting the BNNT material on the filter paper in fabricating the BNNT buckypapers creates a partial in-plane alignment of the BNNT strands in the plane of the BNNT buckypaper. If in a given embodiment the BNNT buckypapers are stacked or woven as BNNT pads 51 as illustrated in FIG. 5, then the partial in-plane alignment of the BNNT strands is preserved when the stack of BNNT pads 52 is compressed in a direction perpendicular to the plane of the BNNT buckypaper mats 51. The braiding or weaving process shown in FIG. 7 also keeps the partial alignment of the BNNT strands in the plane of the weave. Additionally, the weaving creates an increase in structural integrity of the BNNT buckyweave 71. In some embodiments this buckyweave 71 can be stacked as illustrated in FIG. 5. In preferred embodiments, the weaving step interconnects layer to layer, such that the stacked BNNT layers have the structural integrity for use in vibration damping applications.

Figure 8:
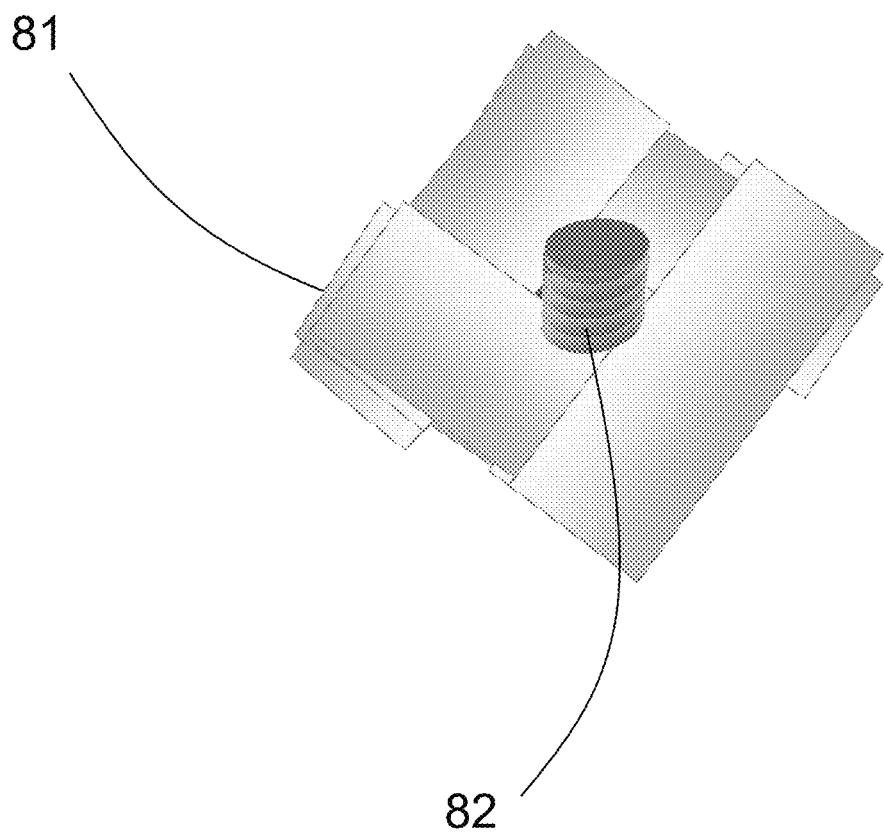
FIG. 8 illustrates and shows an example pattern of braiding BNNT strips (paper in the image) together to form a BNNT pad.

It should be appreciated that the present approach is not limited to a particular weaving pattern. FIG. 8 shows the weaving of some paper strips 81 around a bolt 82 that illustrates how the layers of a stack can be interconnected via bending back over the neighboring length to create a morphology with enhanced structural integrity. This is a common geometry for woven lanyards and bracelets and as those with ordinary skill in the art are aware there are a variety of patterns available. In the geometry shown there is an opening in the middle such that the resultant form factor includes a central opening for, as a non-limiting example, desired fastening mechanism or mechanical element. The number of sides and width of the strips can be varied, as should be appreciated by those having an ordinary level of skill in the art. Alternatively, if the item shown in FIG. 8 is compressed in a direction parallel to the layers, the item becomes a BNNT pellet with the direction of partial alignment of the BNNT network staples along the direction of compression. In some embodiments, the direction of compression with respect to the partial alignment may take place within a die appropriate for the desired geometry. For example, a BNNT pellet may be formed by wrapping a BNNT buckyweave around a mandrel in a cylindrical die, and compressed along the length of the mandrel, perpendicular to the partial alignment of the BNNT buckyweave.

In some embodiments, a BNNT vibration damper may include a BNNT yarn or other lengths of BNNT fabric, woven to provide structural integrity from leveraging the internal staple length of the networked BNNTs to provide the interconnections between the different components in the final BNNT pad or BNNT pellet. In other embodiments the BNNT buckyweave 72 can be wrapped in a cylindrical shape around a cylinder or rod 73 as shown in FIG. 7. In this embodiment the in-plane partial alignment of the BNNT strands is preferentially in the direction of the axis of the cylinder 73 because the plane of the buckypapers in the buckyweave is parallel to the axis of the cylinder 73. In these embodiments, the BNNT buckyweave 71 provides an enhanced structural integrity to the final BNNT material, which may be a BNNT pad or a BNNT pellet, and provides the preferred storage modulus and Tan δ appropriate for the particular embodiment. In the embodiments shown in FIGS. 1, 9, 10, 11, 14 and 15, the axial compression of the BNNT buckyweave was within the confines of a 1 cm diameter die and the pressure used was 10 MPa. Cylinder used for wrapping the BNNT buckyweave had been removed though in some embodiments it can be preserved as will be discussed for FIGS. 16 and 17. The diameter chosen for the cylinder to be useful for the testing, but any diameter can be utilized. The density of the final BNNT pellet after axial compression was approximately four times the density of the wrapped BNNT buckyweave prior to compression. The rearrangement of the BNNT buckyweave following the compression process provides sufficient layer to layer interaction, such that the final pellet has structural integrity needed to retain its form factor and performance as a vibration damper. Compression in the plane of partial alignment of the BNNT buckyweave within a die is also effective for noncircular geometries, such as discussed above for the buckyweave illustrated in FIG. 8. Examples include polygonal shapes when viewed from the direction of compression, such as rectangular, square, and triangular. The compression may be varied to achieve a desired density. For example, BNNT buckyweave vibration damper may have a compressed density of greater than about 0.1 $g/cm^3$ and less than about 1.1 $g/cm^3$. In some embodiments, the density may be between about 0.4 $g/cm^3$ and about 0.7 $g/cm^3$. In some embodiments, the density may be between about 0.5 $g/cm^3$ and 0.9 $g/cm^3$.

In the prototypes being described, D2G buckypapers were determined to be optimally refined as discussed above by testing of the resultant BNNT pads and/or BNNT pellets appear to best retain their structure upon folding during weaving (i.e., do not break at the crease); the Q2G buckypapers also easily fold and stay together at the creases and/or bend fairly well; the Q1G folds but will slightly break apart at the creases and bends. This macroscale observation relates to the nano- and micro-scale properties of the lengths of the BNNTs in the different BNNT materials, the interconnection nodes and the network staple lengths. For example, the D2G BNNT material appears to have longer BNNT strands and longer network staple lengths as compared to the Q2G BNNT material. The person of ordinary skill should therefore appreciate that a BNNT material similar to D2G may be advantageous in embodiments that benefit from a folded vibration damper such as one wrapped and then compressed in a cylindrical shape to form a BNNT pad and/or BNNT pellet that would have improved structural integrity due to the longer BNNT strands and network staple length. All of these considerations are utilized in different embodiments to optimize the viscoelastic properties including storage modulus, Tan δ and the variation in of these parameters with average pressure. Also important for this embodiment of forming the BNNT pads and pellets, these woven mats retain their integrity under repeated pressure and temperature cycling. Simple stacking as described for the BNNT pads of FIG. 5 can more easily break apart as discussed above for FIG. 6, although in some embodiments the resultant storage modulus and Tan δ from that process, may be preferred though this is uncommon.

Controlling the storage modulus of the final BNNT pad may be important in some embodiments. In combination with the viscoelastic properties of the BNNT material itself, the length (or height) and cross sectional area of the final BNNT pad determines the spring constant of the mat. The spring constant with the attached mass determines the natural frequency of vibration of the assembly for systems behaving as simple harmonic oscillators. In some embodiments, the assembly processes going into making BNNT pads and pellets may be tailored to adjust the storage modulus of the final mat. For example, if high pressures, e.g., pressures over about 10 MPa are used in compressing the BNNT material into the mats and pellets, then the storage moduli will be altered. Typically, higher pressures (e.g., compression pressures in excess of 10 MPa and up to 50 MPa; for high pressures and very high pressures include pressures in excess of 50 MPa) will increase the storage modulus and lower the Tan δ. Varying the storage modulus may have an effect on the loss tangent in some embodiments, for example, in some embodiments the effect has been on the order of 50%. Separately, if the visco-elastically-enhanced BNNT material is aligned and/or woven into the desired geometry, the storage moduli may be either raised or lowered depending on the desired geometry. The alignment of the BNNT molecular strands may be achieved as discussed above for BNNT buckyweaves, yarns and fabrics, and in some embodiments the alignments will provide different storage moduli in different directions. For example, if the BNNT strands are on average aligned with, perpendicular or at angles to the direction of vibration, the storage modulus will be affected. The production processes utilized for making high quality BNNT material may also produce some alignment of the BNNTs into BNNT strands, BNNT fibers, and BNNT yarn, such as described in International Patent Application PCT/US15/27570, incorporated by reference in its entirety. Such alignment results from the flow fields in the BNNT self-assembly and post self-assembly regions of the synthesis process. Whether the alignment comes from the production process, a post production refining, chemical treatment and/or dispersion process, a compression process, a spinning and/or weaving process making yarns or fabrics as discussed International Patent Application PCT/US2015/027570, or combinations thereof, the alignment may be utilized to both optimize the loss tangent and create the desired storage modulus. Those of ordinary skill in the art should recognize that these parameters may be varied to achieve the properties desired for a given embodiment.

Figure 9:
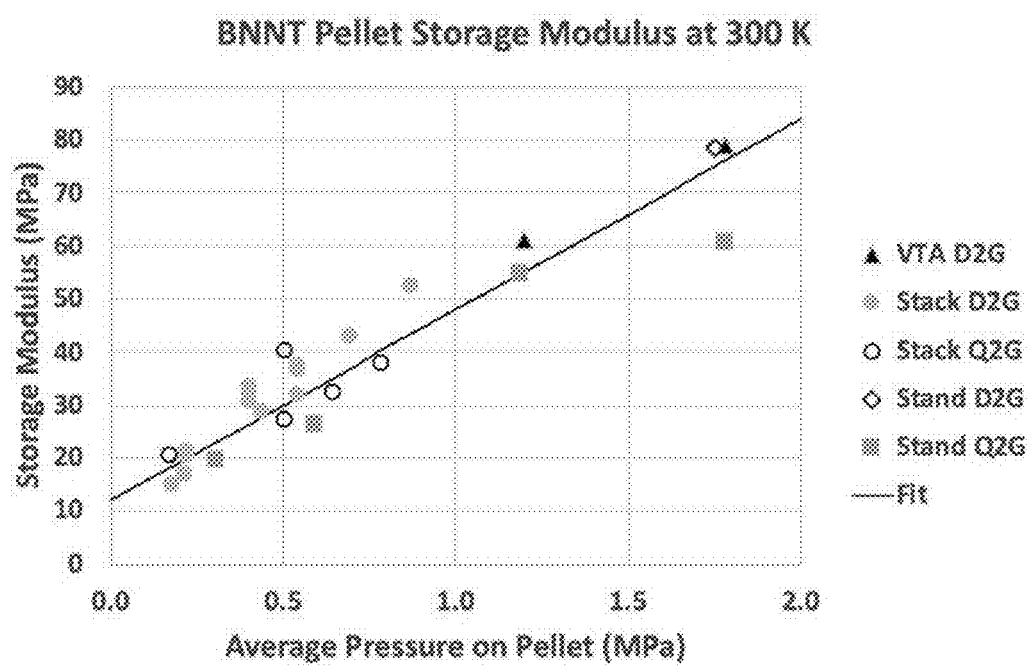
FIG. 9 shows the variation of BNNT pellet storage modulus with average pressure for one embodiment of the present approach.

FIG. 9 shows how storage modulus varied with average pressure for a BNNT pellet embodiment where the refining was good but not optimal. The data demonstrate how the storage modulus of a woven BNNT buckypapers woven into a BNNT buckyweave and formed into a BNNT pellet may be controlled, as discussed above in connection with FIG. 7. In FIG. 9, the storage modulus for D2G and Q2G woven BNNT pads that were compressed at 10 MPa varies with the average pressure on the BNNT pellet. VTA, Stack and Stand in the legend of FIG. 9 refer to different test assemblies. The Fit in FIG. 9 is a linear fit with the parameters of: storage modulus (MPa)=12 MPa+36 MPa×average pressure on the pellet in MPa. It should be understood that these parameters are for the specific embodiment discussed for D2G and Q2G BNNT buckyweaves that have been shown in FIG. 7 at 10 MPa into a BNNT pellet, in which the weave is wrapped around an axis aligned to the direction of compression and that direction is used as the direction of vibration being damped. Alternate embodiments, particularly with respect to the BNNT material and the form factor, may produce different results.

Figure 10:
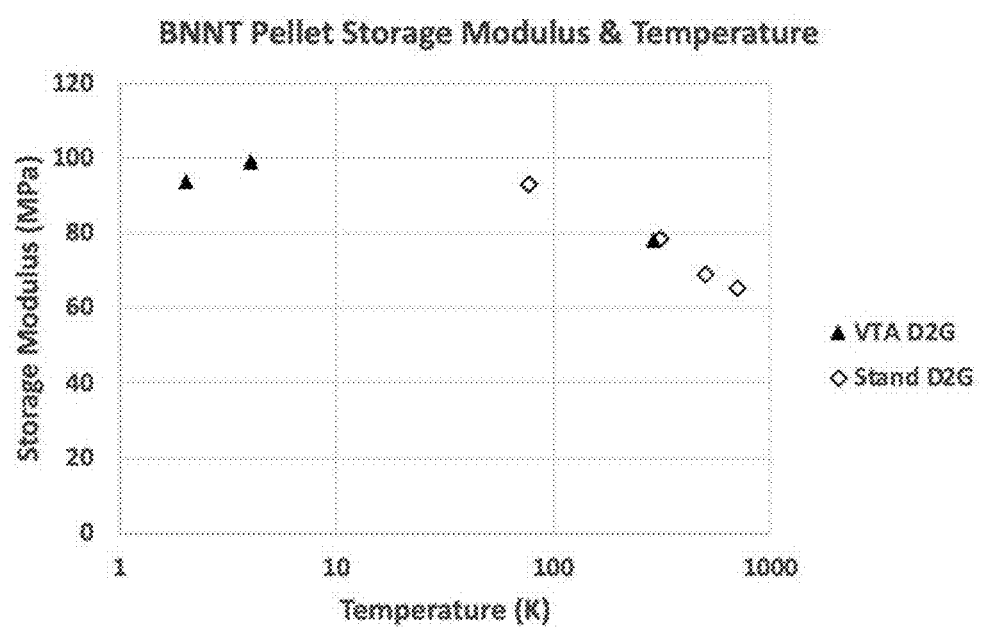
FIG. 10 shows the variation of BNNT pellet storage modulus with temperature for one embodiment of the present approach.

FIG. 10 shows the storage modulus variation with temperature from 2 K to 700 K for the illustrative embodiment described in connection with FIG. 9. For this embodiment, the Tan δ was in the range of 0.12 to 0.23 over the range of average pressures and temperatures indicated for FIG. 9 and FIG. 10.

Figure 11:
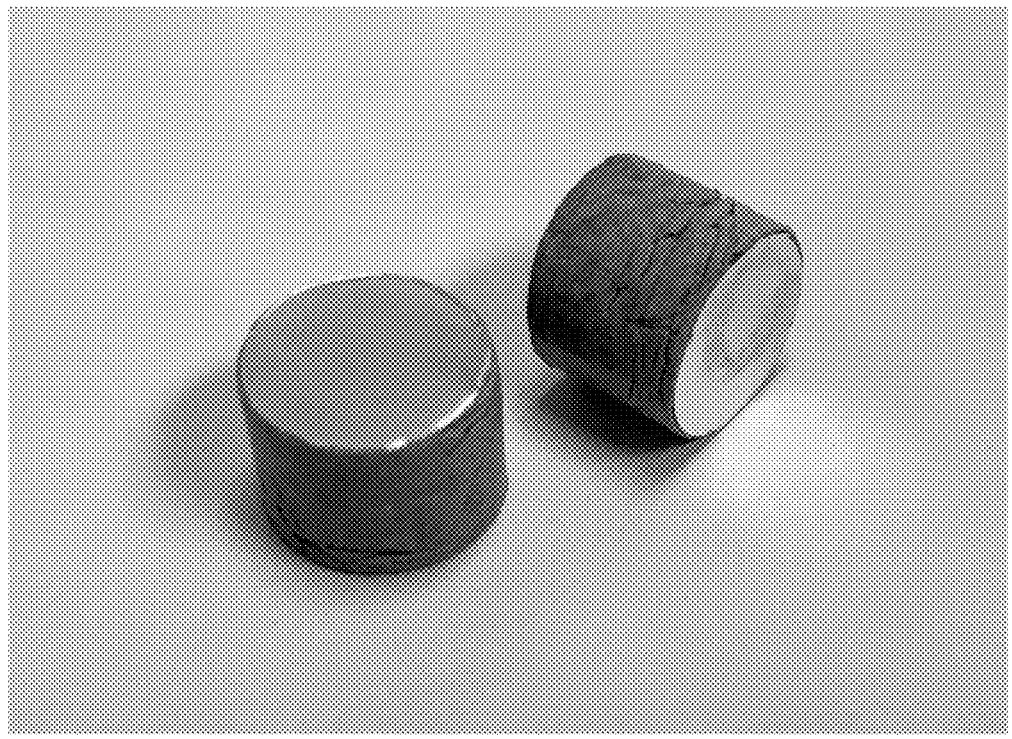
FIG. 11 shows two BNNT pellets that are made with optimized material and optimized weaving for their assembly.

By optimizing the refining process for D2B material, e.g., removing non-BNNT species from the synthesized BNNTs without hindering the material's foldability for forming buckyweaves, and using BNNT buckyweaves to braid the BNNT pellets, the enhanced performance provided in Table 2 has been achieved. The BNNT buckyweaves were wrapped around a mandrel and then compressed axially. FIG. 11 shows two of these BNNT pellets. In some embodiments, thin aluminum foils may be used on the ends of the pellets to simplify pellet removal from the die after compression. These foils are typically removed in most applications. Physically, these can be easily handled as they maintain their integrity as compared to stacked BNNT buckypapers that have been cut from unwoven buckypapers and compressed. FIG. 6 discussed above shows an example of one of these stacked BNNT buckypaper mats that fell apart with minimal handling. Replacing the BNNT buckypapers with stacked and compressed synthesized cutouts from BNNT puffballs does not improve the adhesion of the layers and typically makes it worse from the point of view of structural integrity. To make BNNT pads rather than BNNT pellets requires a morphology where the layers are arranged to have woven interconnections from the BNNT buckyweaves, yarns or other fabrics in the final BNNT pad and/or BNNT pellet as illustrated and shown in FIG. 8. Performance testing at lower and higher temperatures is ongoing, and performance at 2 K is anticipated to match the performance at 77 K based on measurements with other BNNT materials.

TABLE 2

Performance of optimized D2G BNNT buckyweave pellets at 3.3 MPa average pressure.

| Temperature (K) | Storage Modulus (MPa) | Loss Coefficient (tan delta) |
| --- | --- | --- |
| 77 | 150-160 | 0.4-0.5 |
| 300 | 130-140 | 0.4-0.5 |
| 700 | 170-200 | 0.4-0.5 |

When the average pressure on the BNNT buckyweave pellets provided in Table 2 is reduced to near 0.5 MPa, the Tan δ lowers by roughly 20% and the storage modulus drops in the range of 30-40%. For BNNT pads and pellets made with the optimized processes and morphologies discuss herein, the values of Tan δ and storage modulus are stable with cycling in temperature and average pressure after the first few cycles.

Figure 12:
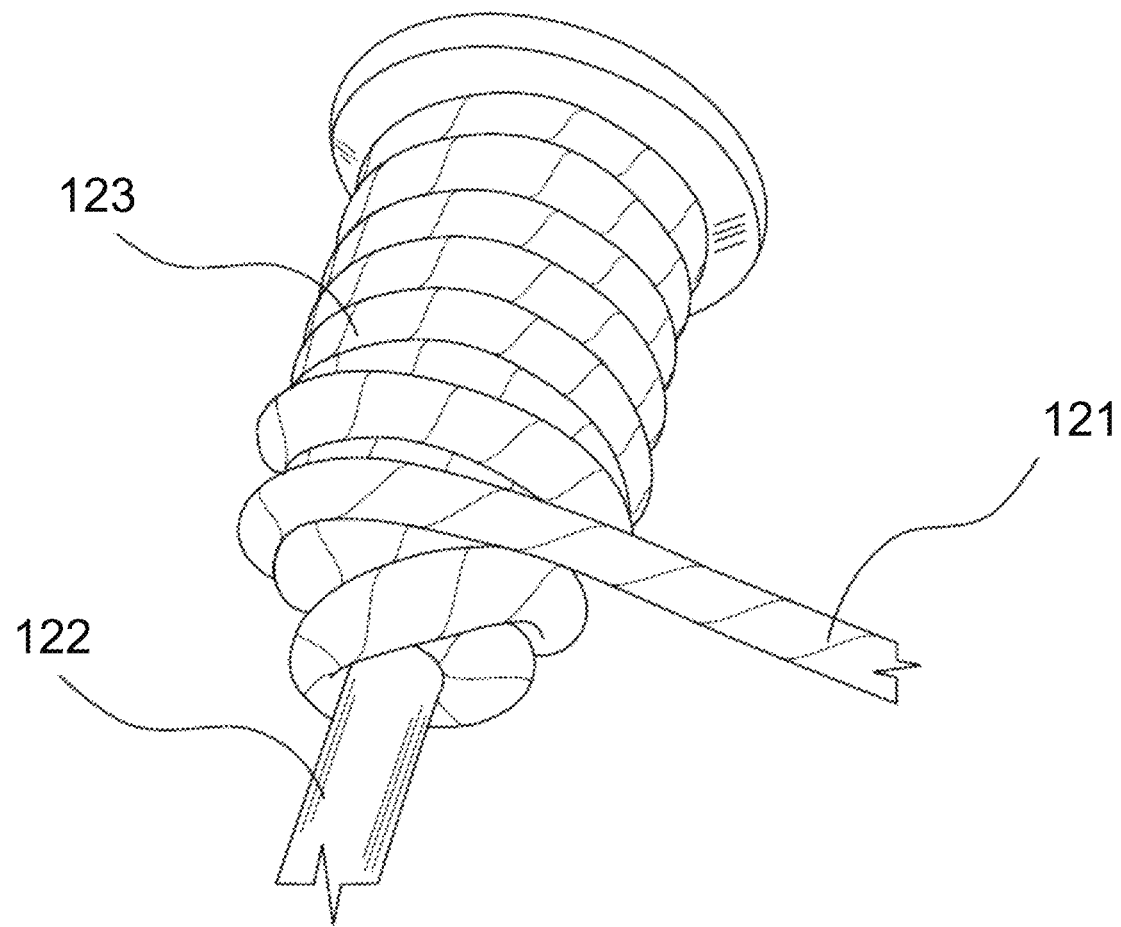
FIG. 12 illustrates a BNNT thread or yarn spooled on a mandrel to make a BNNT cylindrical pad with aligned BNNT molecular strands.

FIG. 12 illustrates an embodiment for making a visco-elastically-enhanced BNNT material in the form of cylindrical BNNT pad 123. It should be appreciated that the present approach may be used to form different geometries and morphologies. BNNT material in the form of a thread or yarn 121 is wound around a mandrel 122. The wound material may have one or more layers of yarn 121, depending on the particular embodiment. The visco-elastically-enhanced BNNT thread or yarn may be made with partially aligned BNNT material. The BNNT molecular networked strands that form the BNNT material with their resultant staple length may be made into threads and multiple threads may be wound into yarns, although in some embodiments the yarns are made directly from the BNNT material that, in turn, may be made into ropes, fabrics, etc. The alignment of the BNNT molecular strands may be enhanced with these different forms of BNNT material for different purposes including enhancing the mechanical resilience of the final BNNT pad and enhancing the viscoelastic properties for vibration damping.

Figure 13:
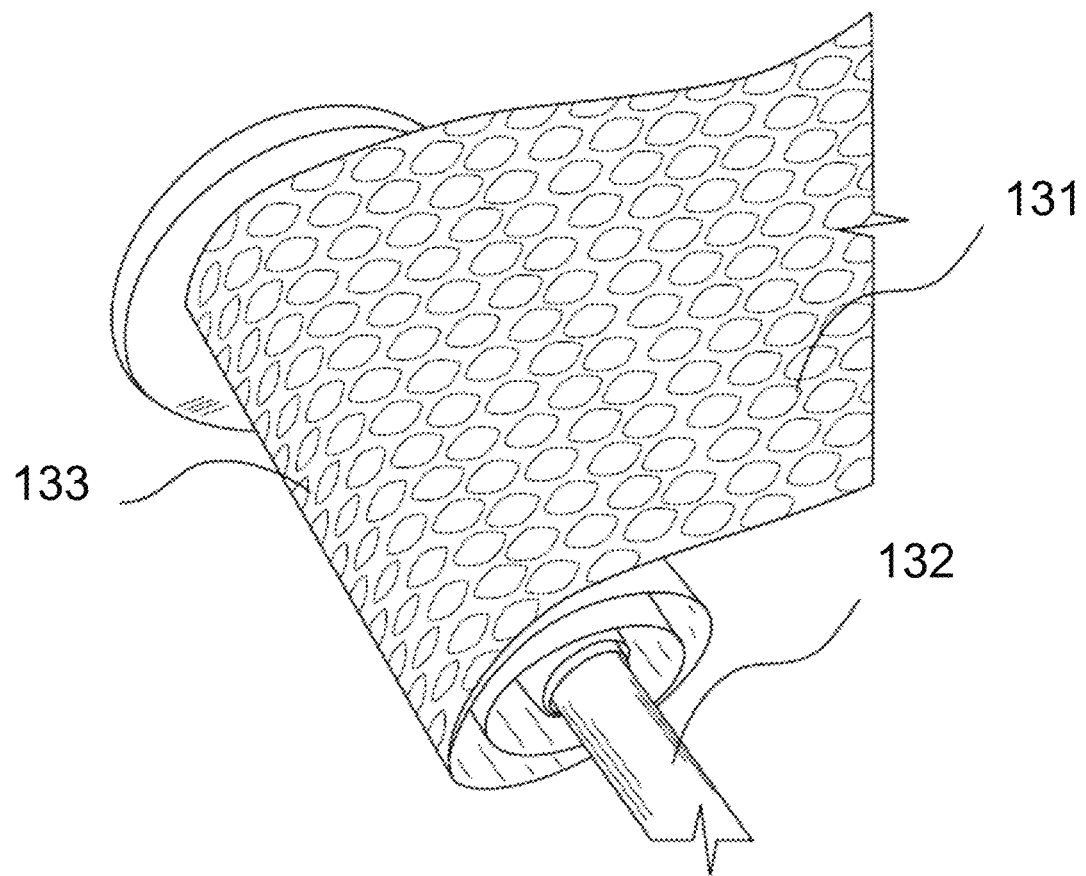
FIG. 13 illustrates a BNNT fabric wrapped on a mandrel to make a BNNT cylindrical pad with aligned BNNT molecular strands in an embodiment of the present approach.

FIG. 13 illustrates a visco-elastically-enhanced BNNT fabric 131 wrapped around a mandrel 132 to form a cylindrical BNNT pellet 163 after compression along the mandrel axis. In this embodiment, the nanotubes are generally partially aligned in the direction of the mandrel axis. BNNT fabric 131 may also be a BNNT buckyweave 72 as shown in FIG. 7. The alignments of the BNNT molecular strands and staples can be tailored by the directions and amounts of BNNT yarns going into the BNNT fabric 131 in a given direction. The selected alignment determines the directional characteristics of the alignment within the fabric, in turn directionally controlling the storage moduli of the resultant material. BNNT threads can be long, i.e. beyond meters, particularly when they are made of BNNT partially aligned material. Further, the threads can be stiff, i.e. they will droop less than 1 cm for a 10 cm length, if the thread material is compacted to the densities discussed above. Consequently, these stiff threads can be formed, wound and woven into structures such as coils around mandrels and fabrics discussed above. This is similar to metals being formed into springs and fabrics. For example, the storage modulus of a steel spring can be orders of magnitude less than the storage modulus of steel itself. This is an additional example of the multiple ways that the storage modus of the BNNT material including aligned BNNT material can be arranged to vary the storage modulus. These three embodiments are meant to serve as examples only, and demonstrate how the alignment of the strands and staples of BNNT may be incorporated into the threads and yarns that make up the BNNT material(s) forming the final BNNT pads and BNNT pellets. Controlling these alignments and controlling the geometries and pressures utilized in the assembly process may be utilized to optimize the loss tangent and storage modulus of the material for a given vibration damping implementation.

Figure 14:
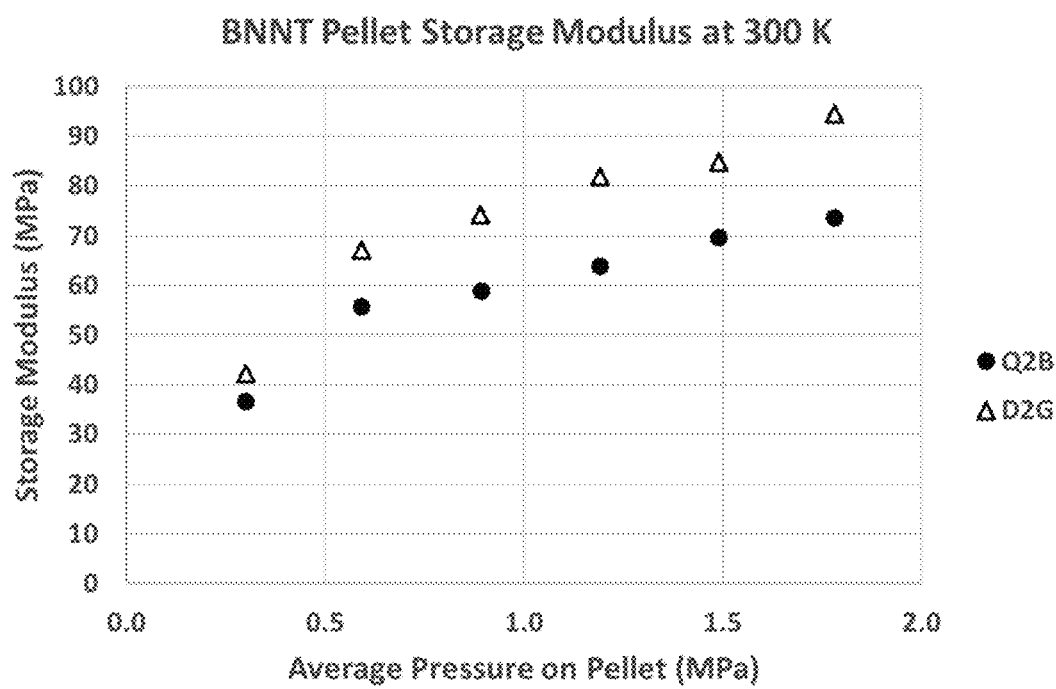
FIG. 14 shows the storage modulus for two BNNT pellets made with different materials and assembly pressures.
Figure 15:
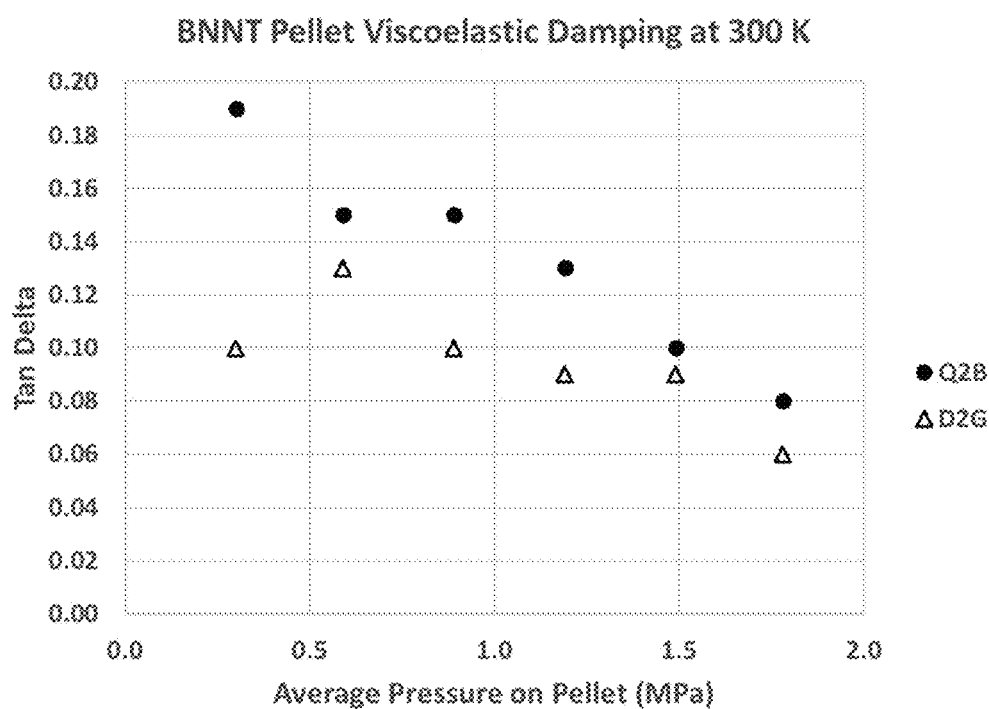
FIG. 15 shows the Tan δ for two BNNT pellets made with different materials and assembly pressures.

FIGS. 14 and 15 show the importance of BNNT material selection, and the methods and geometry for assembly into a vibration damper material, such as BNNT pads and pellets. In FIGS. 14 and 15 the storage modulus and Tan δ, respectively, are shown for two different BNNT pellets. Both pellets were made from BNNT buckypapers that were cut and woven into BNNT buckyweaves as discussed above for FIG. 7. The D2G pellet, i.e. made from refined D2 material as discussed above, was compressed at 10 MPa and the Q2B pellet, i.e. made from unrefined Q2 material, was compressed at 20 MPa. The combined differences in BNNT synthesis process and compaction pressure result in the Q2B BNNT pellet having a lower storage modulus compared to the D2G BNNT pellet as shown in FIG. 14, and the Q2B BNNT pellet having a higher Tan δ compared to the D2G BNNT pellet as shown in FIG. 15. Both the Q2B and D2G pellets have partial alignment of the BNNT strands along the direction of the axis of the cylindrical pellets as discussed for FIG. 7. However, the optimized refining of the D2G material that is tuned to the specific D2G material discussed for Table 2 provides further enhanced performance for viscoelastic properties. Altering the assembly process can alter this alignment as discussed above and also modify the viscoelastic properties. As those with ordinary skill in the art of vibration damping should appreciate, having the ability to tune the storage modulus, Tan δ and geometry of the viscoelastic damping components while achieving required structural integrity is important for successful engineering for vibration damping.

The transport of phonons along the BNNT molecules may be further enhanced by utilizing isotopically-enhanced BNNTs. Separately, both $^{10}$B and $^{11}$B enhancements provide benefits by increasing the loss tangent of the final BNNT mat. A boron feedstock may be selected for BNNT synthesis that contains $^{10}$B and/or $^{11}$B. For example, isotopically enhanced boron is commercially available at 96% for $^{10}$B and 98% for $^{11}$B and can be used for the synthesis of BNNT by the processes discussed above and incorporated herein by reference, as synthesis processes are insensitive to the isotopic content of the boron.

The transport of phonons and the storage modules of the final BNNT pad may also be modified by mixing in non-BNNT material into the materials going into the BNNT pad or BNNT pellet. For example, at the nano and micro scales, nano and/or micro fillers may be introduced into a BNNT material, such as, for example, the BNNT strands 21 illustrated in FIG. 2, and at the macro scale layers of other material may be placed between the mats 51 illustrated in FIG. 5. It should be appreciated that one or more commonly used viscoelastic materials known in the art, such as rubber, amorphous polymers, semicrystalline polymers, biopolymers, metals at very high temperatures, and bitumen materials may be used as a filler. In some embodiments, one or more mats of commonly used viscoelastic material(s) known in the art, may be adjacent to one or more BNNT pads or pellets. The behavior of such materials will be consistent over a limited temperature range, though one of ordinary skill in the art can determine an appropriate configuration for a given embodiment. In the examples shown in FIGS. 2 and 5, the loss tangent of the assembly will likely be reduced, but the storage modulus may be changed either up or down as required for a given embodiment. As one skilled in the art will appreciate, there is great flexibility in combining materials to create vibration damping systems.

The viscoelastic behavior of BNNT pellets has been observed at temperatures as low as 2 K (liquid nitrogen) and has high as 700 K, as can be seen in FIG. 10. Further, BNNT viscoelastic behavior is expected to be present from near absolute zero to the maximum temperatures for BNNT, which is estimated to be in the region of 1900 K. Over the measured region from 2 K to 700 K, the loss tangent of the material is minimally effected by the temperature. Experimental results indicate that BNNT viscoelastic vibration damping is effective for applications at superconducting radio frequencies (SRF), e.g. typically 2 K or 4 K, supports for structures holding quantum computers typically in the range of 2 K to 80 K for the support infrastructure though sometimes beyond this range, supports for cryogenic temperature sensors typically in the range from 2 K to 80 K, liquid natural gas (LNG) temperatures, and temperatures experienced in high temperature turbine engines. Additionally, indications are that the viscoelastic properties will extend to temperatures below 2 K and this is anticipated to be important for the quantum computers and related sensors, dilution refrigerators and laser cooled systems that typically operate at temperatures from 2 K down to temperatures near absolute zero.

Figure 16:
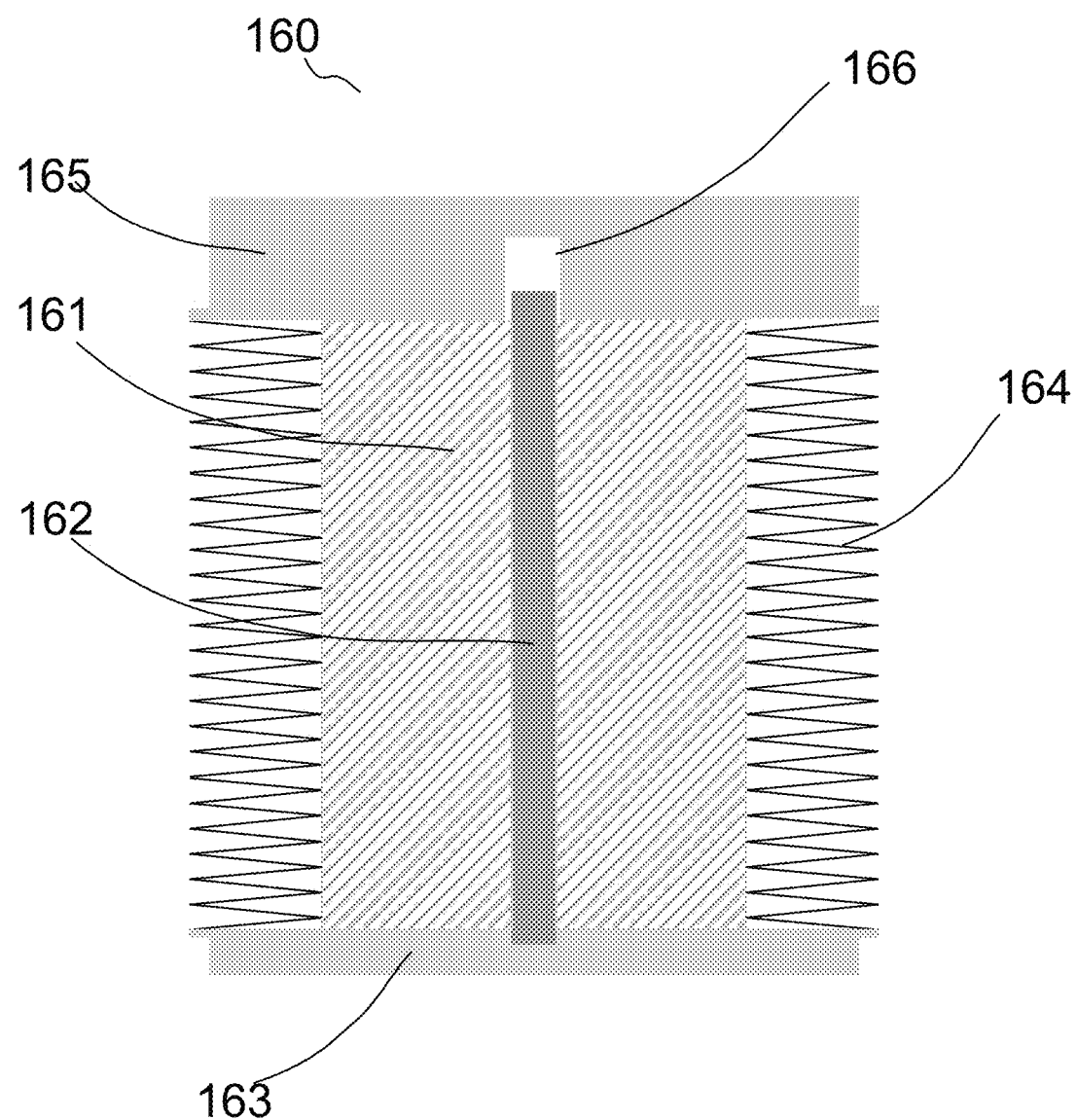
FIG. 16 illustrates an embodiment of a BNNT cylindrical pad within a bellows.

In some embodiments, the visco-elastically-enhanced BNNT material may be encased in a structure that may separate the BNNT material from its environment, such as in SRF, LNG, and gas turbine environments. For example, the BNNT material may be in the form of a BNNT pad or pellet, and the application requiring vibration damping may involve solvent flow. FIG. 16 illustrates one embodiment of a cylindrical BNNT pellet 161 formed around a mandrel column 162 and supported by the mandrel pellet 163. A bellows 164 is placed around the BNNT pellet 161 and connected to the mandrel pellet 163 and top pellet 165. The bellows 164 may be a stainless steel welded bellows but may also be any other material that provides the separation of the BNNT pellet from its environment. The mandrel column 162 may freely vibrate within an opening 166 in the top pellet 165. Alternate embodiments of the arrangement would be to use stacked circular BNNT pads as illustrated in FIG. 5 that have holes in their centers to go around the mandrel column 162 or the braided stack illustrated and shown in FIG. 8.

Figure 17:
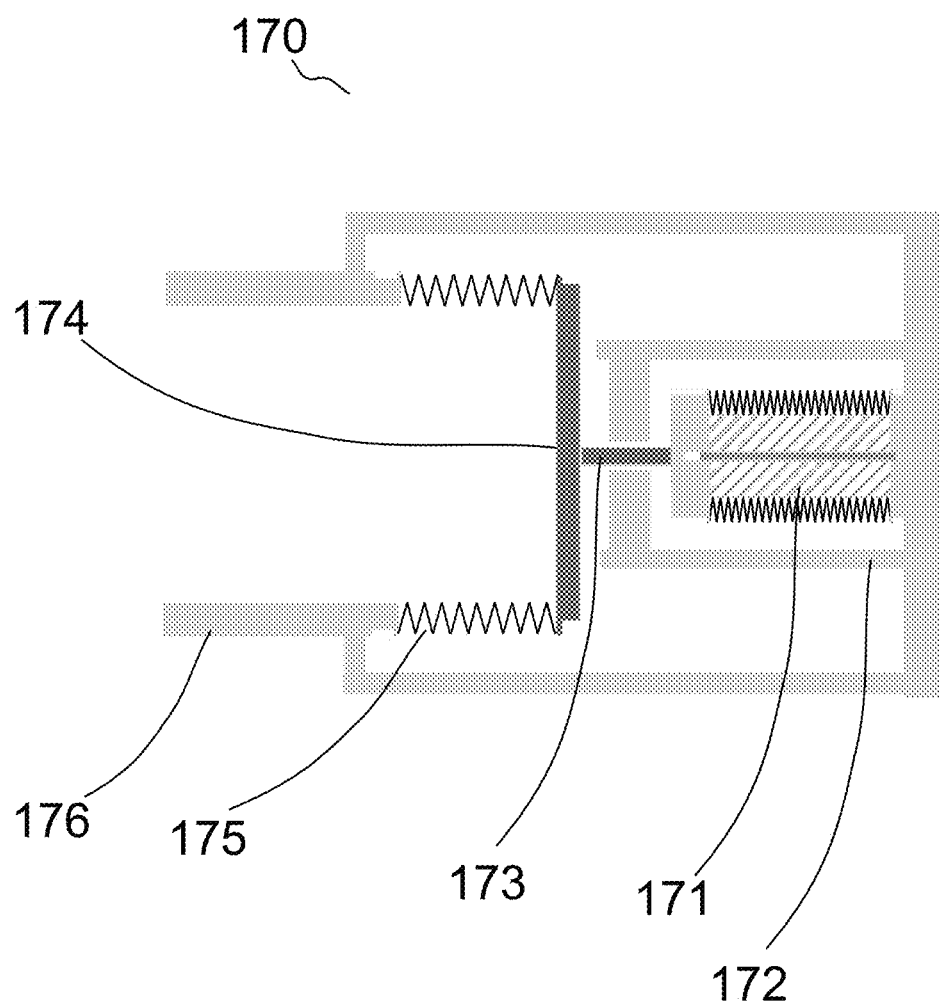
FIG. 17 illustrates an embodiment of a BNNT cylindrical pad with a driving bellows.

In some embodiments, BNNT pads and pellets for vibration damping may be incorporated into complex structures. For example, FIG. 17 illustrates the BNNT cylindrical pellet 161 from FIG. 16 incorporated into a housing 172 and 176 for vibration damping of a gas pressing on a pellet 174. Vibrations from the pellet 174 are transmitted to the BNNT cylindrical pellet 171 via a sliding rod 173 and a flexible bellows 175. Such an arrangement may be utilized in various applications, such as, for example, in controlling gas vibrations in SRF and LNG cooling facilities. The BNNT pads and pellets discussed in the figures are illustrative only. It should be appreciated that the present approach enables a wide variety of configurations. The structural integrity, loss tangent and storage modulus performance of the BNNT pads and pellets may be optimized for a given embodiment by optimizing the quality of the BNNT material in the synthesis and refining processes to include preserving the network staple length, aligning the material in the synthesis and processing steps, and controlling the assembly processes in the fabrication steps. In particular, the weaving of the BNNT buckypapers, BNNT yarns, and BNNT fabrics such as to provide the structural integrity as discussed above is essential for achieving high performance viscoelastic damping.

Those of ordinary skill in the art should appreciate that embodiments of the present approach may significantly depend on the initial BNNT synthesis process. The BNNT material resulting from a particular synthesis process will have a variety of parameters, ranging from diameter and length averages to impurity content. Such parameters may vary significantly for different synthesis processes. Those parameters, in turn, will likely impact the post-synthesis processing (such as, for example, refining steps, compression and shaping, etc.) that may be appropriate to prepare a BNNT material for a vibration damping embodiment. The examples described herein are provided as demonstrative, and should not be understood as limiting the scope of the present approach.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present approach may be embodied in other specific forms without departing from the spirit or essential characteristics thereof. The disclosed embodiments are therefore to be considered in all respects as illustrative and not restrictive, the scope of the present approach being indicated by the claims of the application rather than by the foregoing description, and all changes which come within the meaning and range of equivalency of the claims are therefore intended to be embraced therein. One of ordinary skill in the art should appreciate that numerous possibilities are available, and that the scope of the present approach is not limited by the embodiments described herein.

What is claimed is:

1. A vibration damper comprising a plurality of compressed boron nitride nanotube (BNNT) buckypaper strips woven into a buckyweave.

2. The vibration damper of claim 1, wherein the boron nitride nanotubes in the boron nitride nanotube buckyweave have a partial alignment, and the boron nitride nanotube buckyweave is compressed in a direction perpendicular to the planar bulk alignment.

3. The vibration damper of claim 1, wherein the boron nitride nanotubes in the boron nitride nanotube buckyweave have a partial alignment, and the boron nitride nanotube buckyweave is compressed in a direction parallel to the planar bulk alignment.

4. The vibration damper of claim 1, wherein the compressed boron nitride nanotube buckyweave comprises a plurality of boron nitride nanotube buckyweave layers.

5. The vibration damper of claim 1, wherein the compressed boron nitride nanotube buckyweave comprises a plurality of compressed boron nitride nanotube buckyweave layers.

6. The vibration damper of claim 1, wherein the compressed boron nitride nanotube buckyweave comprises a stack of boron nitride nanotube buckyweave layers.

7. The vibration damper of claim 1, wherein the compressed boron nitride nanotube buckyweave comprises a stack of compressed boron nitride nanotube buckyweave layers.

8. The vibration damper of claim 6, wherein the stack of boron nitride nanotube buckyweave layers is stacked in a first direction and is compressed in the first direction.

9. The vibration damper of claim 6, wherein the stack of boron nitride nanotube buckyweave layers is stacked in a first direction and is compressed in a direction perpendicular to the first direction.

10. He vibration damper of claim 1, wherein the boron nitride nanotubes in the boron nitride nanotube buckyweave have a cylindrical partial alignment about a long axis, and the boron nitride nanotube buckyweave is compressed in a direction parallel to the long axis.

11. The vibration damper of claim 1, wherein the boron nitride nanotube buckyweave has a form factor that is one of circular, annular, polygonal, rectangular, and square.

12. The vibration damper of claim 1, wherein the BNNTs in the buckyweave comprise a BNNT material having a boron particle content of less than 50%, but greater than 0%, by weight of the BNNT material.

13. The vibration damper of claim 1, wherein the BNNTs in the buckyweave comprise a BNNT material having a BNNT content of at least 40%, but less than 100%, by weight of the BNNT material.

14. The vibration damper of claim 1, wherein the BNNTs in the buckyweave comprise an isotopically-enhanced BNNT material in which boron isotopes are about 96% $^{10}$B.

15. The vibration damper of claim 1, wherein the BNNTs in the buckyweave comprise an isotopically-enhanced BNNT material in which boron isotopes are about 98% $^{11}$B.

16. The vibration damper of claim 1, wherein the vibration damper has a density of greater than 0.1 g/cm$^3$ and less than 1.1 g/cm$^3$.

17. The vibration damper of claim 1, further comprising a binder material.

18. The vibration damper of claim 17, wherein the binder material comprises boron oxide.

19. A method of forming a boron nitride nanotube buckyweave vibration damper, the method comprising:
 dispersing synthesized boron nitride nanotubes (BNNTs) in a dispersant;
 collecting the dispersed BNNTs on a filter; and
 evaporating the dispersant to form a BNNT buckypaper on the filter;
 weaving the BNNT buckypaper to form a BNNT buckyweave; and
 compressing the BNNT buckyweave.

20. The method of claim 19, further comprising forming a plurality of BNNT buckyweaves, stacking the plurality of BNNT buckyweaves in a first direction, and compressing the plurality of BNNT buckyweaves.

21. The method of claim 20, wherein the compression is in a direction parallel to the first direction.

22. The method of claim 20, wherein the compression is in a direction perpendicular to the first direction.

23. The method of claim 19, further comprising separating the BNNT buckypaper into a plurality of strips, and wherein weaving the BNNT buckypaper comprises weaving the plurality of strips.

24. The method of claim 19, further comprising wrapping the BNNT buckyweave around a mandrel having a long axis, and compressing the BNNT buckyweave in a direction parallel to the long axis.

25. The method of claim 24, wherein the compression occurs in a die to form the compressed BNNT buckyweave in a desired form factor.

26. The method of claim 25, wherein the desired form factor is one of circular, annular, polygonal, rectangular, square, and triangular.

27. The method of claim 19, wherein the synthesized boron nitride nanotubes comprise a BNNT material having a boron particle content of less than 50%, but greater than 0%, by weight of the BNNT material.

28. The method of claim 19, wherein the synthesized boron nitride nanotubes comprise a BNNT material having a BNNT content of at least 40%, but less than 100%, by weight of the BNNT material.

29. The method of claim 19, wherein the synthesized boron nitride nanotubes comprise an isotopically-enhanced BNNT material in which boron isotopes are about 96% $^{10}$B.

30. The method of claim 19, wherein the synthesized boron nitride nanotubes comprise an isotopically-enhanced BNNT material in which boron isotopes are about 98% $^{11}$B.

* * * * *